(12) United States Patent
Park et al.

(10) Patent No.: US 12,574,657 B2
(45) Date of Patent: Mar. 10, 2026

(54) IMAGE SENSOR WITH VARIABLE LENGTH OF PHASE DATA

(71) Applicant: Samsung Electronics Co., Ltd., Suwon-si (KR)

(72) Inventors: Dong-Jin Park, Suwon-si (KR); Seongwook Song, Suwon-si (KR); Jeehong Lee, Suwon-si (KR); Hyukjung Lee, Suwon-si (KR); Sunghyuk Yim, Suwon-si (KR); Wooseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 366 days.

(21) Appl. No.: 18/141,515

(22) Filed: May 1, 2023

(65) Prior Publication Data

US 2024/0031692 A1 Jan. 25, 2024

(30) Foreign Application Priority Data

Jul. 22, 2022 (KR) ........................ 10-2022-0091097

(51) Int. Cl.
*H04N 25/443* (2023.01)
*H04N 23/67* (2023.01)
*H04N 25/46* (2023.01)
*H04N 25/78* (2023.01)

(52) U.S. Cl.
CPC ......... *H04N 25/443* (2023.01); *H04N 23/672* (2023.01); *H04N 25/46* (2023.01); *H04N 25/78* (2023.01)

(58) Field of Classification Search
CPC .... H04N 25/443; H04N 23/672; H04N 25/46; H04N 25/78; H04N 25/77; H04N 25/704; H04N 25/76; H04N 25/75
See application file for complete search history.

(56) References Cited

U.S. PATENT DOCUMENTS

| | | | | |
|---|---|---|---|---|
| 5,003,339 | A * | 3/1991 | Kikuchi ............... | H04N 23/673 |
| | | | | 348/347 |
| 8,525,917 | B2 | 9/2013 | Taniguchi | |
| 8,531,560 | B2 | 9/2013 | Kimura | |
| 8,704,942 | B2 | 4/2014 | Shimoda et al. | |
| 9,883,128 | B2 | 1/2018 | Banachowicz et al. | |
| 9,906,744 | B2 | 2/2018 | Kim | |
| 9,986,184 | B2 | 5/2018 | Seo et al. | |
| 10,321,042 | B2 * | 6/2019 | Sakaguchi ............. | G02B 7/285 |
| 10,412,349 | B2 | 9/2019 | Hwang et al. | |

(Continued)

FOREIGN PATENT DOCUMENTS

JP 2014-238425 A 12/2014

OTHER PUBLICATIONS

EPO Search Report dated Oct. 31, 2023 from the EPO for corresponding EP Patent Application 23187079.1.

*Primary Examiner* — Hung H Lam
(74) *Attorney, Agent, or Firm* — Muir Patent Law, PLLC

(57) ABSTRACT

An image sensor includes a pixel array including a plurality of pixels arranged in a row direction and a column direction and a read-out circuit that generates image data and phase data based on a sensing signal received from the pixel array. The image sensor is configured the resolution of the phase data output by read-out circuit depending on target area information for the pixel array, the target area information received from outside of the image sensor.

20 Claims, 31 Drawing Sheets

10

(56) References Cited

U.S. PATENT DOCUMENTS

| | | | |
|---|---|---|---|
| 10,848,697 B2 | 11/2020 | Watanabe et al. | |
| 10,998,356 B2 | 5/2021 | Okuno et al. | |
| 2007/0160359 A1* | 7/2007 | Imamura .................. | G03B 7/28 |
| | | | 396/238 |
| 2014/0028896 A1* | 1/2014 | Oshima ................ | H04N 23/811 |
| | | | 348/350 |
| 2015/0109515 A1 | 4/2015 | Kobuse | |
| 2017/0163873 A1 | 6/2017 | Kim et al. | |
| 2019/0028653 A1* | 1/2019 | Minami ................. | H04N 23/62 |
| 2022/0094862 A1 | 3/2022 | Jung et al. | |

* cited by examiner

FIG.9

| LS | Image data1 | LE |
| LS | Image data2 | LE |
| LS | Image data3 | LE |
| LS | Image data4 | LE |
| LS | Phase data | LE |

FIG.12

| LS | Image data1 | LE |
|----|-------------|----|
| LS | Image data2 | LE |
| LS | Image data3 | LE |
| LS | Image data4 | LE |
| LS | Phase data1 | LE |

IMAGE SENSOR WITH VARIABLE LENGTH OF PHASE DATA

CROSS-REFERENCE TO RELATED APPLICATIONS

This application claims priority under 35 U.S.C. § 119 to Korean Patent Application No. 10-2022-0091097 filed on Jul. 22, 2022, in the Korean Intellectual Property Office, the disclosure of which is incorporated by reference herein in its entirety.

BACKGROUND

Embodiments of the present disclosure described herein relate to an image sensor, and more particularly, relate to an image sensor supporting an auto focusing (AF) function.

A complementary metal-oxide semiconductor (CMOS) image sensor is an image capturing device manufactured by using a CMOS process. Compared to a charge-coupled device (CCD) image sensor including a high-voltage analog circuit, the CMOS image sensor has low manufacturing costs and has low power consumption due to a small pixel size. Moreover, as the performance of the CMOS image sensor is improved, the CMOS image sensor is widely used in mobile electronic devices such as a smartphone, a tablet PC, or a digital camera.

Nowadays, an automatic focus adjustment function has been provided in a digital image capturing device such as a camera. To realize the automatic focus adjustment function, it is necessary to detect a focus adjustment state of a shooting lens. When an element for detecting a focus is included for an AF function separately from an image sensor, costs may be additionally increased or the size of a device may be increased for the purpose of manufacturing a digital image capturing device. Accordingly, an AF image sensor capable of performing both an image capturing function and an auto focusing function (hereinafter, an "AF function") is being studied. In particular, when a digital zoom operation or region-of-interest (ROI) operation is supported, it is important to provide high-resolution phase data for the purpose of an accurate AF function for a zoom area or ROI area.

SUMMARY

Embodiments of the present disclosure provide an image sensor capable of generating high-resolution phase data for a zoom area or an ROI area.

BRIEF DESCRIPTION OF THE FIGURES

The above and other objects and features of the present disclosure will become apparent by describing in detail embodiments thereof with reference to the accompanying drawings.

FIG. 9 is a diagram illustrating an example of a data set including image data generated in FIG. 6 and phase data generated in FIGS. 7 and 8.

FIG. 12 is a diagram illustrating an example of a data set including phase data generated in FIGS. 10 and 11.

DETAILED DESCRIPTION

Hereinafter, embodiments of the present disclosure may be described in detail and clearly to such an extent that an ordinary one in the art easily implements the present disclosure.

[Image Processing Device with Variable Length of Phase Data]

Figure 1:
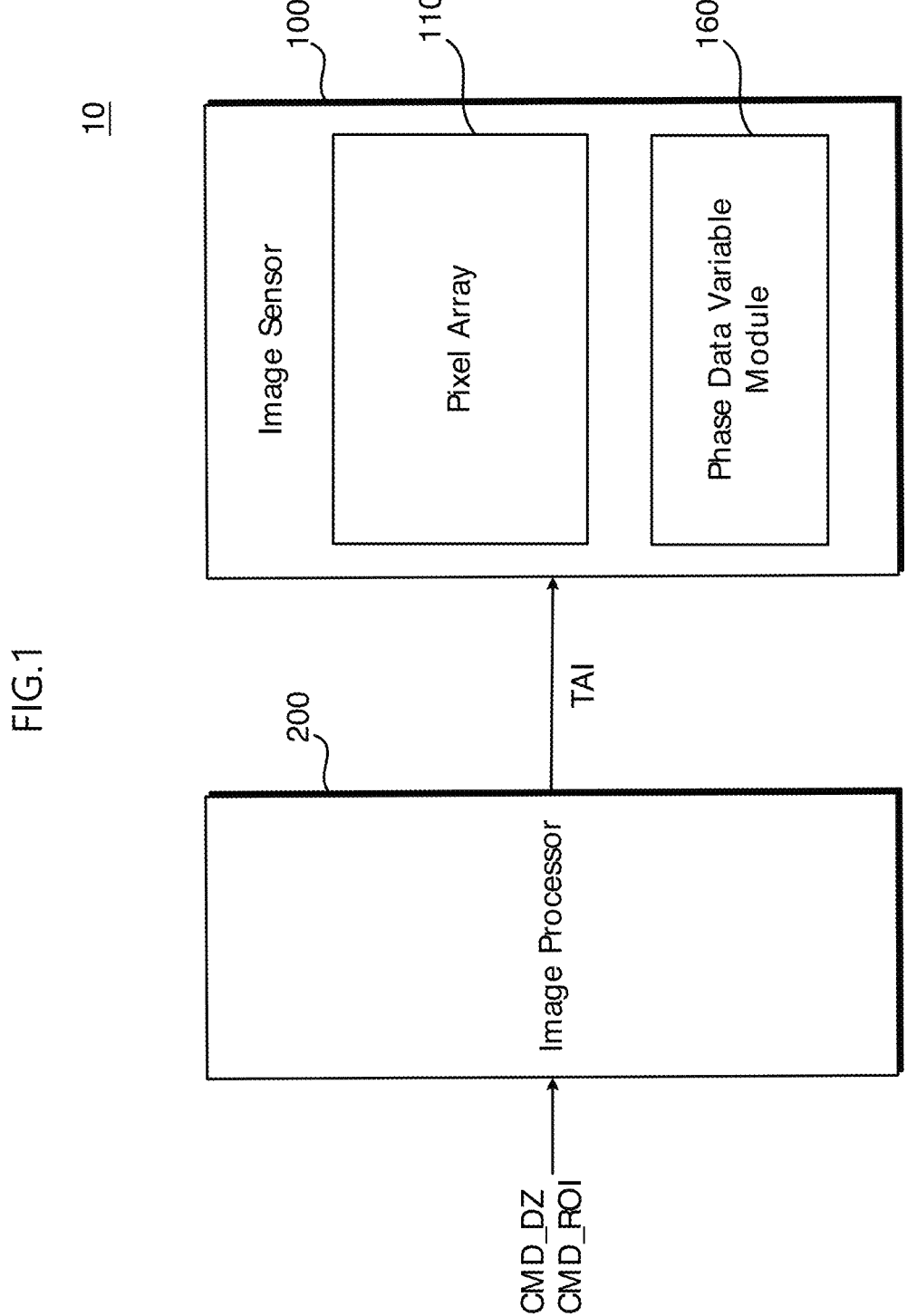
FIG. 1 is a block diagram illustrating an image processing device 10, according to an embodiment of the present disclosure.

FIG. 1 is a block diagram illustrating an image processing device 10, according to an embodiment of the present disclosure.

The image processing device 10 according to an embodiment of the present disclosure may support a zoom operation and/or an ROI operation. During the zoom operation and/or the ROI operation, the image processing device 10 may generate high-resolution phase data by varying a length of phase data (e.g., an amount of phase data) used for auto-focus for a particular image region. Accordingly, an accurate AF function for a zoom area and/or an ROI area may be provided.

Referring to FIG. 1, the image processing device 10 may include an image sensor 100 and an image processor 200.

The image processor 200 may process image data sensed by the image sensor 100 so as to be suitable for human eyes. The image processor 200 may output the processed image data to a display device, such as a display screen on a smartphone or camera. For example, the image processor 200 may be implemented with one of a digital signal processor (DSP), an image signal processor (ISP), or an application processor (AP).

The image processor 200 may receive, from a user or a host (e.g., from outside the image processor 200 or outside the image sensor 100), a digital zoom command CMD_DZ for requesting the digital zoom operation or an ROI command CMD_ROI for requesting the ROI operation. Here, the digital zoom command CMD_DZ or the ROI command CMD_ROI may include information about a zoom area to be enlarged or an ROI area to be focused. For example, the information about the zoom area or ROI area may be referred to as "target area information TAI". The image processor 200 may provide the target area information TAI to the image sensor 100. The information about the zoom area may include the pixel addresses for a particular region resulting from a finger pinch-to-zoom operation, for example. The ROI area may include pixel addresses for a particular region resulting from a finger touch auto focus operation, for example.

Under the control of the image processor 200, the image sensor 100 may sense the intensity of light of an object imaged through a lens. The image sensor 100 may change the sensed intensity of light into digital image data and may output the digital image data to the image processor 200. Moreover, the image sensor 100 may sense a phase difference of light of the imaged object. The image sensor 100 may change the sensed phase difference of light into digital phase data and may output the digital phase data to the image processor 200. To this end, the image sensor 100 may include a pixel array 110 and a phase data variable module 160.

The pixel array 110 may include a plurality of pixels arranged in row and column directions. For example, each of the plurality of pixels may include a photosensitive element that generates and accumulates charges depending on the amount of light or the intensity of light.

The phase data variable module 160 may identify address information of pixels, which correspond to the zoom area and/or the ROI area, from among a plurality of pixels based on the target area information TAI. The phase data variable module 160 may select pixels, which belong to each kernel, from among pixels corresponding to the zoom area and/or ROI area. The image sensor 100 may generate phase data for the zoom area and/or ROI area by binning analog signals or digital signals, which are generated from pixels belonging to each kernel. As is traditional in the field of the disclosed technology, features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

In an embodiment of the present disclosure, the phase data variable module 160 may set each kernel such that the number of pixels corresponding to the same color is the same in each kernel. For example, the phase data variable module 160 may set each kernel such that the number of pixels corresponding to a specific color (e.g., green) is the same in each kernel. When the number of pixels corresponding to the same color is different in each kernel, a difference in a signal level due to a color difference may occur. According to an embodiment of the present disclosure, the phase data variable module 160 may set each kernel such that the number of pixels corresponding to the same color is the same, thereby preventing a difference in a signal level due to the color.

Moreover, in an embodiment of the present disclosure, the phase data variable module 160 may differently set the number of kernels of the pixel array 110 based on the target area information TAI. Accordingly, high-resolution phase data for the zoom area and/or the ROI area may be set by varying a length of the phase data.

For example, in case of a crop zoom mode, under the control of the phase data variable module 160, the number of kernels corresponding to the zoom area may be set based on the target area information TAI so as to be greater than the number of kernels in a full mode for the same zoom area. A full mode refers to a mode when the full pixel array in an image sensor is read and/or processed, whereas a crop zoom mode refers to a mode where only a smaller area of the full pixel array of the image sensor, such as a cropped portion, or a zoomed-in image portion, is read and/or processed. A zoom area refers to an area of pixels that appear on a display and/or are read and/or processed upon zooming the full pixel array image. When zooming, the target area that comprises the zoom area may form the entire image being read and/or processed, and when not zooming (e.g., when in full mode), the target area that comprised the zoom area when zooming may be only a part of the image being read and/or processed. The target area, also described as a target pixel area, may refer to the zoom area or a region of interest (ROI) area that is smaller than the entire image for the entire pixel array, and target area information (TAI) may refer to information that indicates the size and location (e.g., address range) of the target area. Accordingly, a ratio of a length (i.e., amount) of phase data to a length (i.e., amount) of image data (i.e., an amount of phase data/an amount of image data) for a target area in the crop zoom mode may be greater than that for the target area in a full mode, and the high-resolution phase data for the zoom area (e.g., for the target area in the crop zoom mode) may be generated.

As another example, during the ROI operation, under the control of the phase data variable module 160, the number of kernels corresponding to the ROI area may be set based on the target area information TAI so as to be greater than the number of kernels corresponding to another area outside of the target area. Accordingly, a length of the phase data (e.g., an amount of phase data for a given pixel array size) corresponding to the ROI area may be greater than the amount of the phase data (e.g., for the same given pixel area size) of another area outside the target area, and the high-resolution phase data for the ROI area may be generated.

As described above, the image processing device 10 according to an embodiment of the present disclosure may identify address information of pixels corresponding to the zoom area and/or the ROI area based on the target area information TAI during a zoom operation and/or ROI operation and may generate the high-resolution phase data by varying the length of phase data corresponding to the zoom area and/or ROI area. Accordingly, an accurate AF function may be provided.

[Image Sensor with Variable Length of Phase Data by Using Digital Signal]

Figure 2:
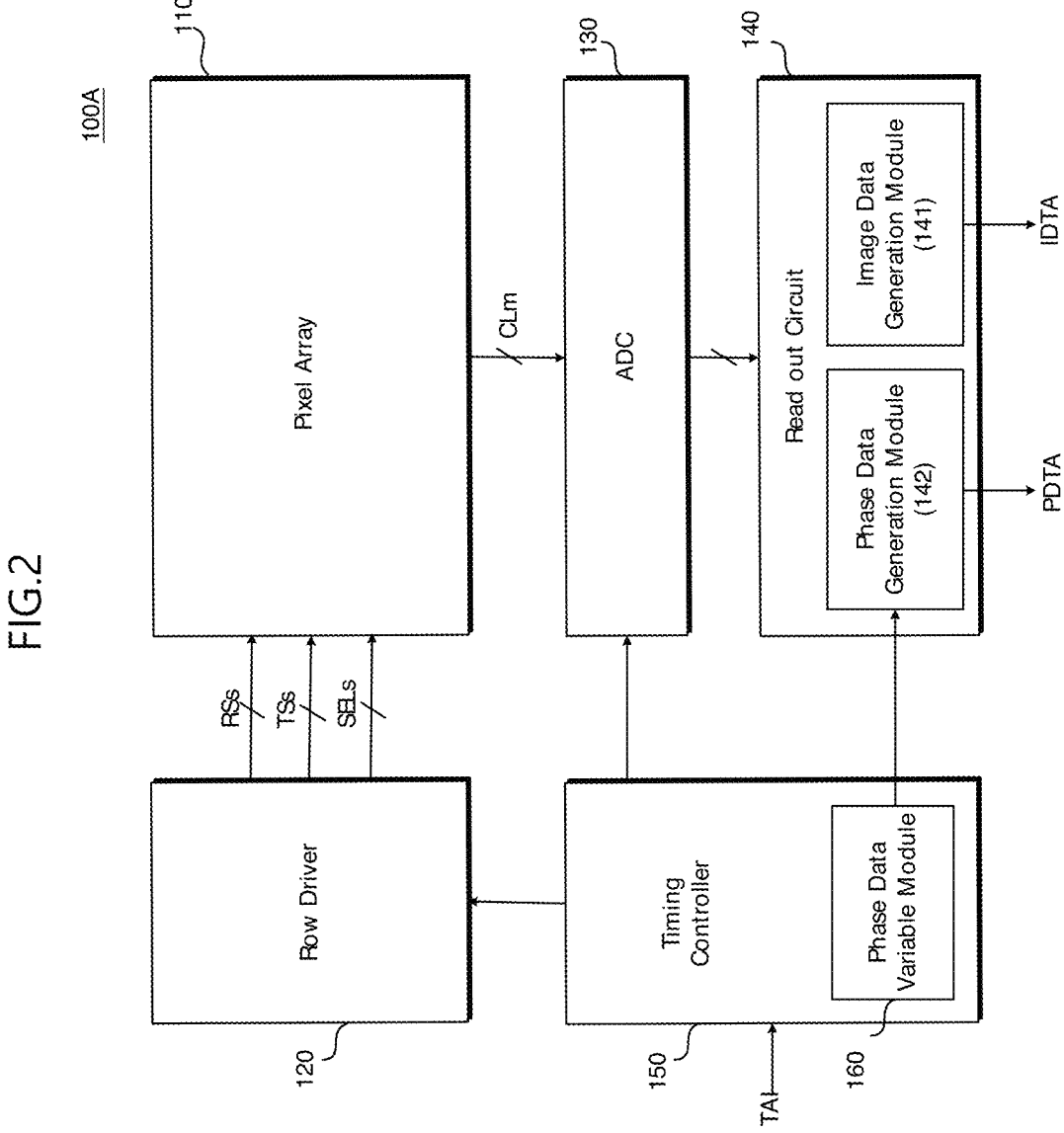
FIG. 2 is a block diagram illustrating an example of an image sensor 100A, according to an embodiment of the present disclosure.

FIG. 2 is a block diagram illustrating an example of an image sensor 100A, according to an embodiment of the present disclosure.

Referring to FIG. 2, the image sensor 100A includes the pixel array 110, a row driver 120, an analog-to-digital converter (ADC) 130, a read-out circuit 140, a timing controller 150, and the phase data variable module 160.

The pixel array 110 may include a plurality of pixel groups PGs, and each of the pixel groups may include at least two pixels PXs sharing the same micro lens ML with each other. The pixel array 110 may receive pixel driving signals such as a reset signal RS, a transmission signal TS, and a selection signal SEL from the row driver 120. The pixel array 110 may operate under the control of the received pixel driving signals, and each of a plurality of pixels may convert an optical signal into an analog signal. The analog signal generated by each pixel may be provided to the analog-to-digital converter 130 through a plurality of column lines CLm.

In an embodiment, the plurality of pixels may have a shared pixel structure in which different photo diodes PD share the same floating diffusion area FD with each other. However, this is only an example, and a plurality of pixels PX may include different floating diffusion areas FD, respectively. The analog signal generated by each pixel may include image information and phase information.

Under the control of the timing controller 150, the row driver 120 may select one row of the pixel array 110. To select a row of a plurality of rows, the row driver 120 may generate the select signal SEL. The row driver 120 may activate the reset signal RS and the transmission signal TS with respect to pixels corresponding to the selected row depending on a predetermined order.

The analog-to-digital converter 130 may receive a reset level signal and a sensing signal, which are generated from each of pixels in a selected row. Here, the reset level signal may be an analog signal corresponding to a reference voltage of a floating diffusion area, and the sensing signal may be an analog signal corresponding to a signal voltage of the floating diffusion area. The analog-to-digital converter 130 may convert the reset level signal and the sensing signal into a digital signal and may output the digital signal. For example, the analog-to-digital converter 130 may sample the reset level signal and the sensing signal in a correlated double sampling manner and may then convert the sampled result into a digital signal. To this end, a correlated double sampler (CDS) may be further included in front of the analog-to-digital converter 130.

The read-out circuit 140 may latch and output the digital signal, which is provided by the analog-to-digital converter 130, in units of column. To this end, the read-out circuit 140 may include an output buffer. Furthermore, the read-out circuit 140 may include an image data generation module 141 and a phase data generation module 142 and thus may generate and output image data and phase data.

In an embodiment, the image data generation module 141 may receive a first digital signal DS1 corresponding to a pixel located on the left side in one pixel group and a second digital signal DS2 corresponding to a pixel located on the right side in the one pixel group. Here, the first digital signal DS1 and the second digital signal DS2 may each include image information and phase information. The image data generation module 141 may generate a piece of image data by synthesizing the first digital signal DS1 and the second digital signal DS2. In this case, phase information of the first digital signal DS1 and phase information of the second digital signal DS2 may cancel out.

In an embodiment, the phase data generation module 142 may receive digital signals corresponding to pixels of a plurality of pixel groups included in one kernel. The phase data generation module 142 may receive digital signals corresponding to pixels located on the left side in a plurality of pixels and may extract first phase information by binning the digital signals. The phase data generation module 142 may receive digital signals corresponding to pixels located on the right side in the plurality of pixels and may extract second phase information by binning the digital signals. The phase data generation module 142 may generate phase data corresponding to one kernel by using the first phase information and the second phase information.

The timing controller 150 may control the pixel array 110, the row driver 120, the analog-to-digital converter 130, the read-out circuit 140, and the like. To perform operations of the pixel array 110, the row driver 120, the analog-to-digital converter 130, the read-out circuit 140, and the like, the timing controller 150 may supply control signals, such as clock signals and timing control signals. The timing controller 150 may include a logic control circuit, a phase locked loop (PLL) circuit, a timing control circuit, a communication interface circuit, and the like. The timing controller 150 may include the phase data variable module 160.

In an embodiment of the present disclosure, the phase data variable module 160 may set kernels, each of which will generate phase data. For example, the phase data variable module 160 may select pixel groups, which are to be included in each kernel, from among a plurality of pixel groups included in the pixel array 110. In this case, the phase data variable module 160 may select pixel groups to be included in each kernel such that the number of pixel groups corresponding to the same color is the same in each kernel.

In addition, in an embodiment of the present disclosure, the phase data variable module 160 may differently set the number of kernels, each of which generates phase data, depending on an operating mode and/or target area.

For example, in the case of a crop zoom mode, under the control of the phase data variable module 160, the number of kernels corresponding to a target area (e.g., a zoomed-in area) may be set based on the target area information TAI so as to be greater than the number of kernels of the target area in a full mode. In the crop zoom mode, the phase data generation module 142 may receive digital signals, which are more than (e.g., a greater number than) digital signals in the full mode, and thus may generate high-resolution phase data. In this case, a ratio of a length (or amount) of phase data to a length (or amount) of image data (i.e., an amount of phase data/an amount of image data) in the crop zoom mode may be greater than that in a full mode. Thus, a density of phase data per area in crop zoom mode (e.g., phase data resolution in crop zoom mode) may be greater than a density of phase data per area in full mode (e.g., phase data resolution in full mode).

As another example, during the ROI operation, under the control of the phase data variable module 160, the number of kernels corresponding to the ROI area may be set based on the target area information TAI so as to be greater than the number of kernels corresponding to another area outside the ROI area. In this case, the phase data generation module 142 may receive a greater concentration of digital signals for phase data in the ROI area than in an area outside the ROI area, and thus an amount of phase data corresponding to the ROI area for a given array size of pixels may be greater than an amount of phase data of the area outside the ROI area for the same array size of pixels. Accordingly, the high-resolution phase data for the ROI area may be generated.

As described above, the image sensor 100A according to an embodiment of the present disclosure may vary the length of the phase data depending on a target area and may generate the high-resolution phase data for the zoom area or the ROI area.

Figure 3:
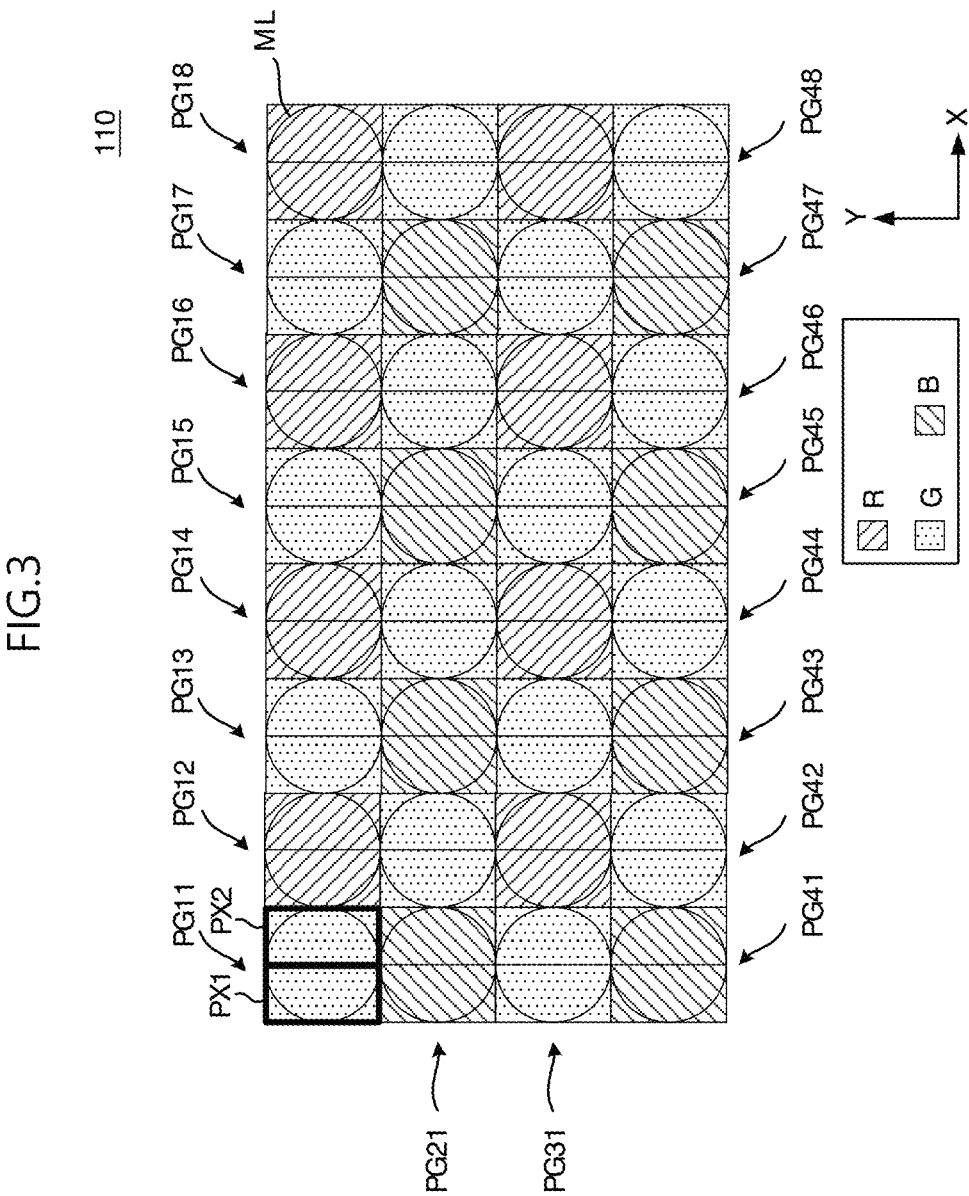
FIG. 3 is a diagram illustrating an example of the pixel array 110 of FIG. 2.

FIG. 3 is a diagram illustrating an example of the pixel array 110 of FIG. 2.

Referring to FIG. 3, the pixel array 110 may include a plurality of pixel groups PG11 to PG48. Each of the plurality of pixel groups PG11 to PG48 includes two pixels PX1 and PX2 arranged in a first direction (X direction), and the two pixels PX1 and PX2 may share the one micro lens ML.

The plurality of pixel groups PG11 to PG48 may be arranged in the pixel array 110 to correspond to a Bayer pattern. For example, the pixel group PG12 may include a color filter of red (R); each of the pixel groups PX11 and PX22 may include a color filter of green (G); and, the pixel group PG21 may include a color filter of blue (B). However, this is only an example. For example, the pixel array 110 according to an embodiment of the present disclosure may include various types of color filters. For example, the color filter may include filters for sensing yellow color, cyan color, and magenta color. Alternatively, the color filter may include filters for sensing a white color.

Figure 4:
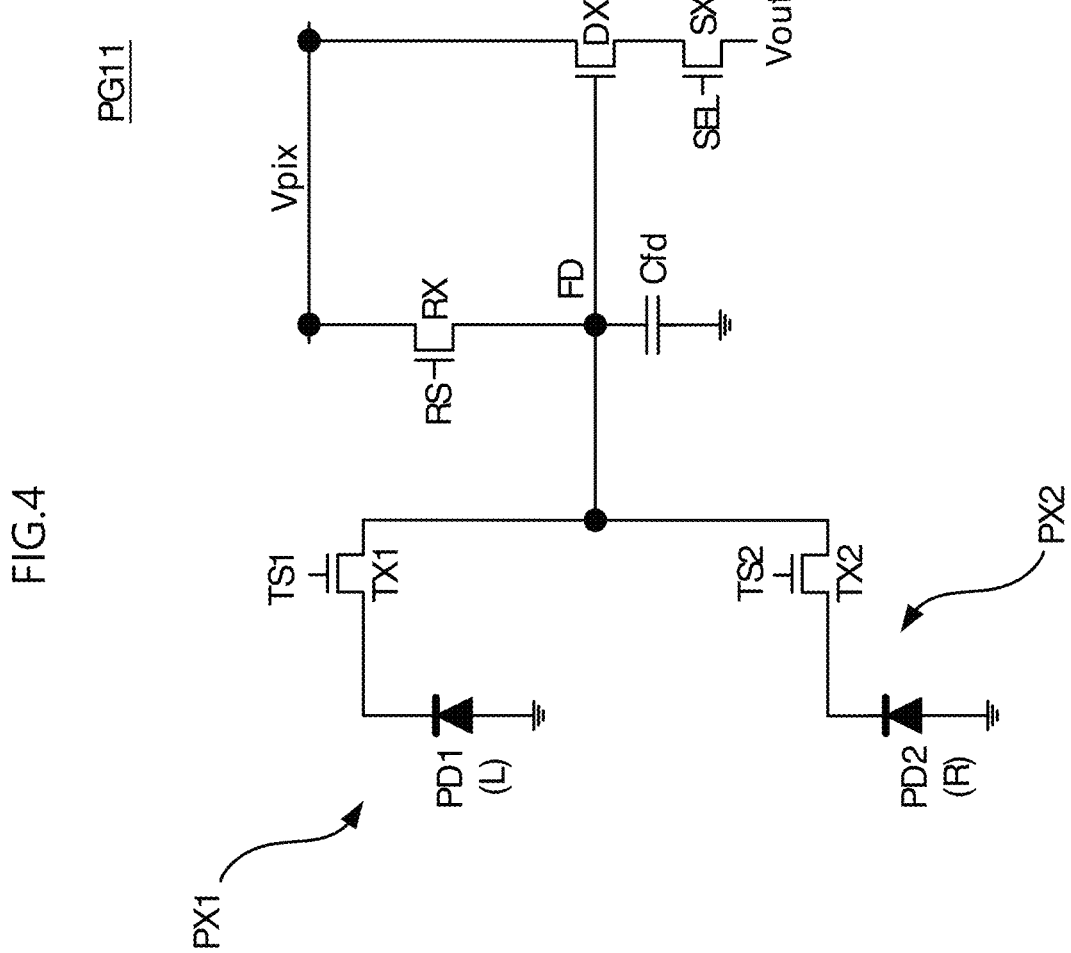
FIG. 4 is a circuit diagram illustrating an example of the pixel group PG11 of FIG. 3.
Figure 5A:
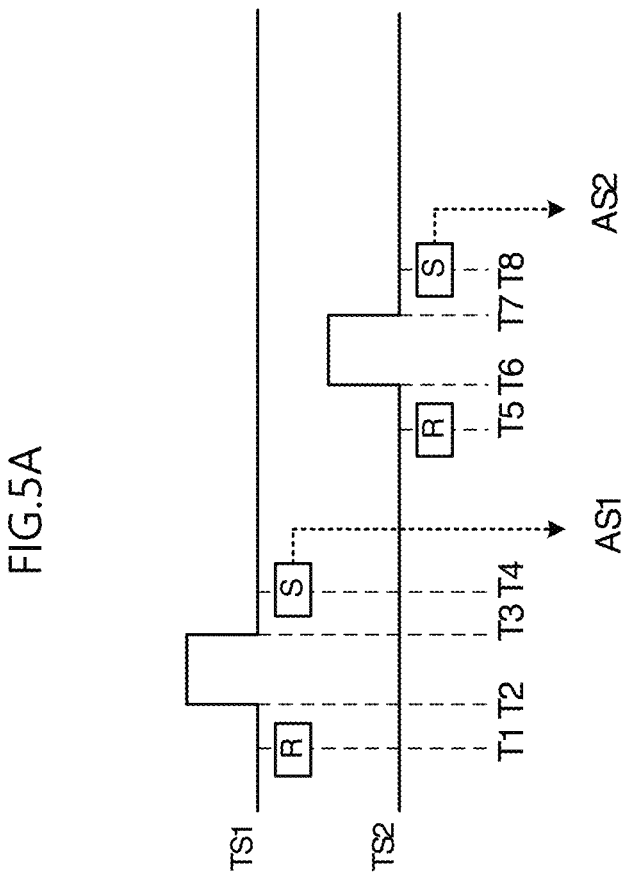
FIGS. 5A and 5B are timing diagrams illustrating an example of an operation of the pixel group PG11 of FIG. 4.
Figure 5B:
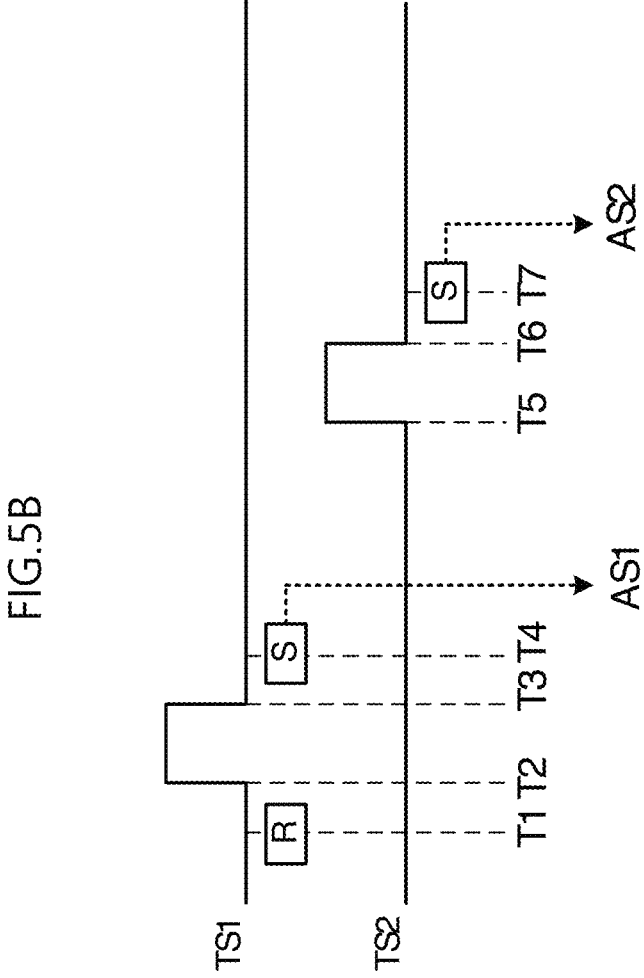

FIG. 4 is a circuit diagram illustrating an example of the pixel group PG11 of FIG. 3. FIGS. 5A and 5B are timing diagrams illustrating an example of an operation of the pixel group PG11 of FIG. 4.

Referring to FIG. 4, the pixel group PG11 may include the first pixel PX1 and the second pixel PX2, which share the floating diffusion area FD with each other. The first pixel PX1 may include a first photo diode PD1 and a first transfer transistor TX1, and may share the floating diffusion area FD, a reset transistor RX, a drive transistor DX, and a selection transistor SX with the second pixel PX2. The second pixel PX2 may include a second photo diode PD2 and a second transfer transistor TX2, and may share the floating diffusion area FD, the reset transistor RX, the drive transistor DX and the selection transistor SX with the first pixel PX1.

Each of the first and second photo diodes PD1 and PD2 may be a photosensitive element that generates and accumulates charges depending on the amount of incident light or the intensity of the incident light. At least one of the first and second photo diodes PD1 and PD2 may also be implemented as a photo transistor, a photo gate, a pinned photo diode (PPD), an organic photo diode (OPD), a quantum dot (QD), or the like.

The first and second transfer transistors TX1 and TX2 may be turned on or off in response to first and second transmission signals TS1 and TS2 provided from the row driver 120, respectively. The first and second transfer transistors TX1 and TX2 may transmit charges accumulated in the first and second photo diodes PD1 and PD2 to the floating diffusion area FD, respectively.

One end of the floating diffusion area FD may be connected to drains of the first and second transfer transistors TX1 and TX2. The other end of the floating diffusion area FD may be connected to a gate of the drive transistor DX driven by a source follower amplifier. The floating diffusion area FD may operate as a floating diffusion area capacitor Cfd and may store charges generated by the first photo diode PD1 or the second photo diode PD2 in the floating diffusion area capacitor Cfd.

The reset transistor RX may reset the floating diffusion area FD in response to the reset signal RS. For example, a source of the reset transistor RX may be connected to the floating diffusion area FD. When the reset signal RS is activated, the reset transistor RX may be turned on, and a power supply voltage Vpix may be supplied to the floating diffusion area FD. In this case, the charges accumulated in the floating diffusion area capacitor Cfd may be drained to a terminal of the power supply voltage Vpix, and a voltage level of the floating diffusion area FD may be reset to the power supply voltage Vpix.

The gate of the drive transistor DX may be connected to the floating diffusion area FD, and may serve as a source follower amplifier. For example, the drive transistor DX may amplify a change in an electrical potential of the floating diffusion area FD and may deliver the amplified change to a column line CLi via the selection transistor SX.

The selection transistor SX may be used to select a pixel or a pixel group, which performs a read operation in units of row. The selection transistor SX may be driven by the selection signal SEL provided in units of a row. When the selection transistor SX is turned on, the potential of the floating diffusion area FD may be amplified through the drive transistor DX and may be delivered to a drain of the selection transistor SX.

Hereinafter, an operation of the pixel group PG11 will be described with reference to FIG. 5A. At time point T1, the reset transistor RX is turned on, and the floating diffusion area FD is reset to the power supply voltage Vpix. The voltage level of the floating diffusion area FD is sampled and is used as a reset level signal.

At time point T2, the first transfer transistor TX1 is turned on in response to the first transmission signal TS1, and thus charges accumulated in the first photo diode PD1 moves to the floating diffusion area capacitor Cfd.

At time point T3, the first transfer transistor TX1 is turned off. At time point T4, the voltage level of the floating diffusion area FD is sampled and is used as a sensing signal. Because the first photo diode PD1 is located on the left side of the pixel group PG11, the sensing signal may include phase information. The sensing signal may be referred to as a "first analog signal AS1" and may be provided to a corresponding column line. Afterward, the analog-to-digital converter 130 may generate a first digital signal including the phase information by using the reset signal sampled at time point T1 and the first analog signal AS1 sampled at time point T4.

At time point T5, the floating diffusion area FD is reset to the power supply voltage Vpix, and the voltage level of the floating diffusion area FD is sampled and is used as a reset level signal.

At time point T6, the second transfer transistor TX2 is turned on in response to the second transmission signal TS2, and thus charges accumulated in the second photo diode PD2 move to the floating diffusion area capacitor Cfd.

At time point T7, the second transfer transistor TX2 is turned off. At time point T8, the voltage level of the floating diffusion area FD is sampled and is used as a sensing signal. Because the second photo diode PD2 is located on the right side of the pixel group PG11, the sensing signal may include phase information. The sensing signal may be referred to as a "second analog signal AS2" and may be provided to a corresponding column line. Afterward, the analog-to-digital converter 130 may generate a second digital signal including the phase information by using the reset signal sampled at time point T5 and the second analog signal AS2 sampled at time point T8. The first digital signal and second digital signal may then be used together (e.g., combined) to determine phase data for a pixel group.

In an RSRS read-out method, digital signals including phase information may be generated by each of the plurality of pixel groups PG11 to PG48. Left and right phase information may then later be combined to determine phase data for pixel groups and kernels.

Hereinafter, another example of an operation of the pixel group PG11 will be described with reference to FIG. 5B. At time point T1, the reset transistor RX is turned on, and the floating diffusion area FD is reset to the power supply voltage Vpix. The voltage level of the floating diffusion area FD is sampled and is used as a reset level signal.

At time point T2, the first transfer transistor TX1 is turned on in response to the first transmission signal TS1, and thus charges accumulated in the first photo diode PD1 moves to the floating diffusion area capacitor Cfd.

At time point T3, the first transfer transistor TX1 is turned off. In this case, a voltage level of the floating diffusion area FD may correspond to a value obtained by adding charges, which are delivered from the first photo diode PD1 to the floating diffusion area FD during an interval from time point T2 to time point T3, to a voltage level of the reset level signal at time point T1.

At time point T4, a voltage level of the floating diffusion area FD is sampled and is used as a sensing signal. Because the first photo diode PD1 is located on the left side of the pixel group PG11, the sensing signal may include phase information. The sensing signal may be referred to as the "first analog signal AS1" and may be provided to a corresponding column line. Afterward, the analog-to-digital converter 130 may generate a first digital signal including phase information by using a reset signal sampled at time point T1 and the first analog signal AS1 sampled at time point T4. For example, the first digital signal may correspond to a value obtained by subtracting a voltage level of the floating diffusion area FD at time point T1 from a voltage level of the floating diffusion area FD at time point T4.

At time point T5, the second transfer transistor TX2 is turned on in response to the second transmission signal TS2, and thus charges accumulated in the second photo diode PD2 moves to the floating diffusion area capacitor Cfd.

At time point T6, the second transfer transistor TX2 is turned off. In this case, a voltage level of the floating diffusion area FD may correspond to a value obtained by adding charges delivered from the second photo diode PD2 to the floating diffusion area FD during an interval from time point T5 to time point T6 to a voltage level at time point T4. For example, the voltage level of the floating diffusion area FD at time point T6 may correspond to a value obtained by adding charges, which are delivered from the first photo diode PD1 and the second photo diode PD2, to a voltage level of the reset level signal.

At time point T7, a voltage level of the floating diffusion area FD is sampled and is used as a sensing signal. Because the second photo diode PD2 is located on the right side of the pixel group PG11, the sensing signal may include phase information. The sensing signal may be referred to as the "second analog signal AS2" and may be provided to a corresponding column line. Afterward, the analog-to-digital converter 130 may generate a second digital signal including phase information by using a reset signal sampled at time point T1, the first analog signal AS1 sampled at time point T4, and the second analog signal AS2 sampled at time point T7. For example, the second digital signal may correspond to a value obtained by subtracting the voltage level of the floating diffusion area FD at time point T1 and the voltage level of the floating diffusion area FD at time point T4 from a voltage level of the floating diffusion area FD at time point T7.

In an RSS read-out method, digital signals including phase information may be generated by each of the plurality of pixel groups PG11 to PG48. Left and right phase information may then later be combined to determine phase data for pixel groups and kernels.

Figure 6:
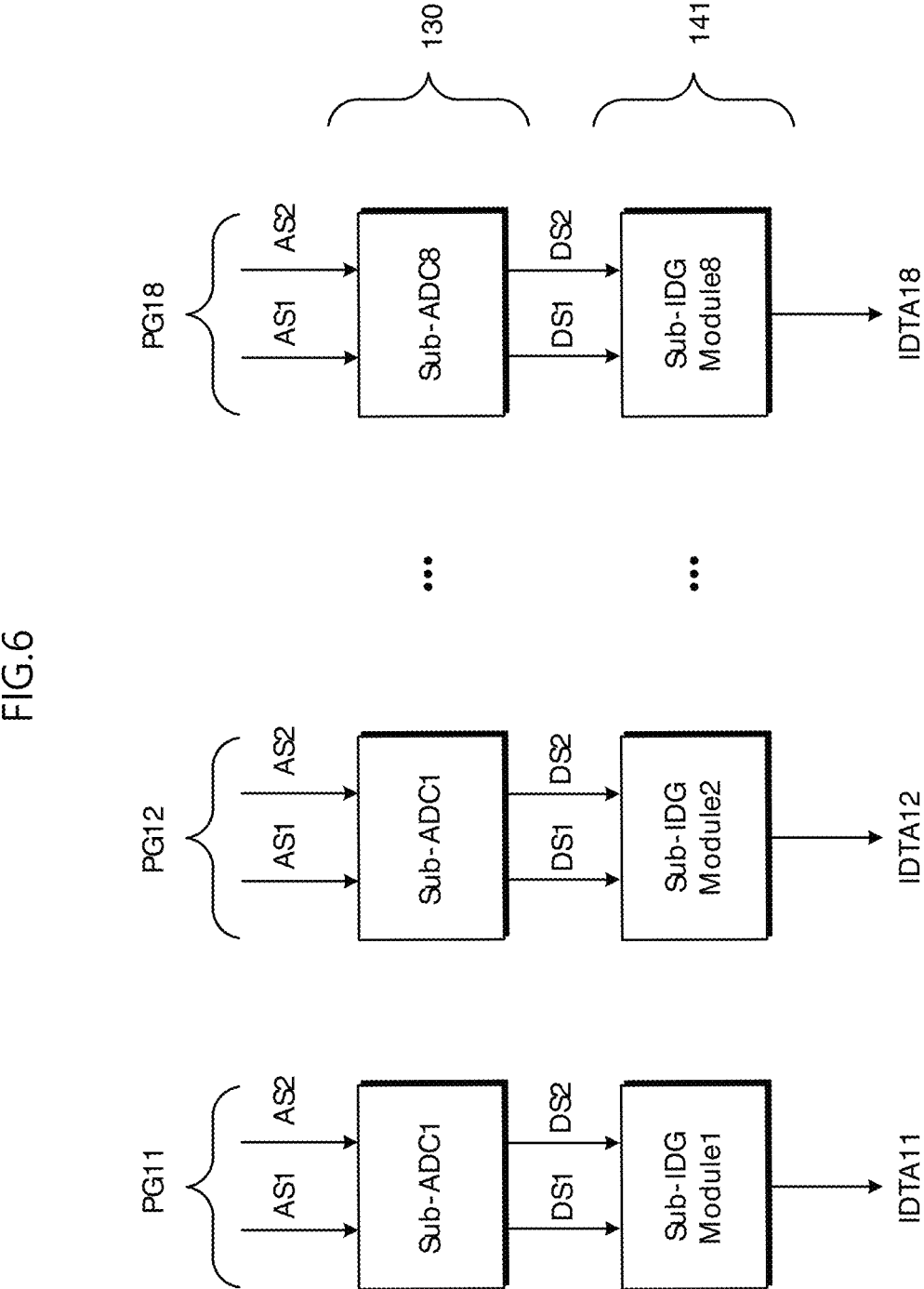
FIG. 6 is a diagram for describing an example in which image data is generated by the image sensor 100A of FIG. 2.

FIG. 6 is a diagram for describing an example in which image data is generated by the image sensor 100A of FIG. 2. For convenience of description, FIG. 6 illustrates that image data is generated by analog signals generated by the pixel groups PG11 to PG18 arranged in a first row.

Referring to FIG. 6, the analog-to-digital converter 130 may include first to eighth sub-analog-to-digital converters Sub-ADC1 to Sub-ADC8. The image data generation module 141 may include first to eighth sub-image data generation modules Sub-IDG Module1 to Sub-IDG Module8.

The first and second analog signals AS1 and AS2 generated from the pixel groups PG11 may be provided to the first sub-analog-to-digital converter Sub-ADC1. The first sub-analog-to-digital converter Sub-ADC1 may output the first and second digital signals DS1 and DS2. The first sub-image data generation module Sub-IDG Module1 may generate image data IDTA11 by summing the first and second digital signals DS1 and DS2. In this case, in one situation, phase information included in the first digital signal DS1 and phase information included in the second digital signal DS2 may be added to cancel out.

In a similar manner, pieces of image data IDTA12 to IDTA18 may be generated based on analog signals generated from the pixel groups PG12 to PG18.

Figure 7:
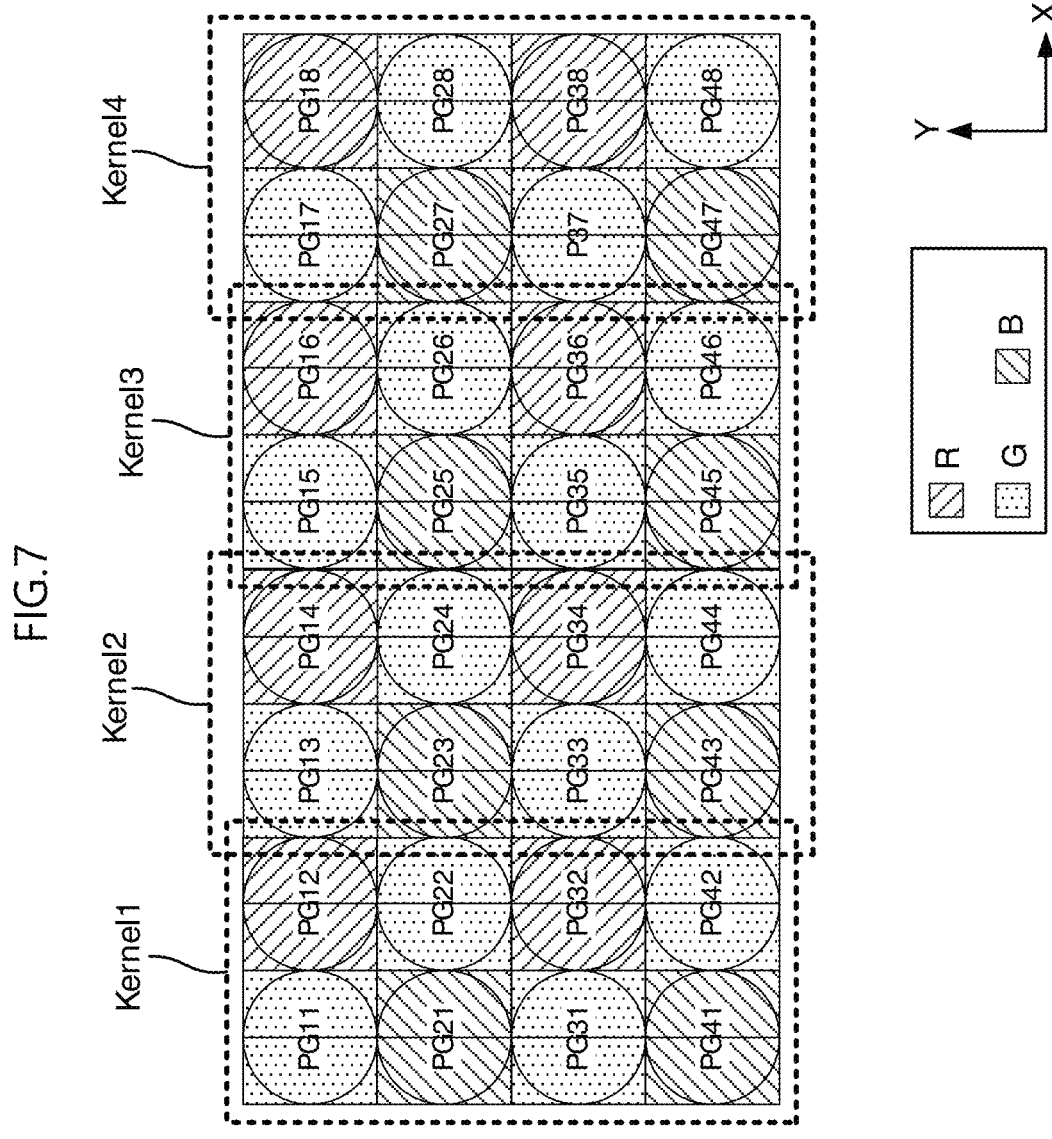
FIGS. 7 and 8 are diagrams illustrating that the image sensor 100A of FIG. 2 generates phase data.
Figure 8:
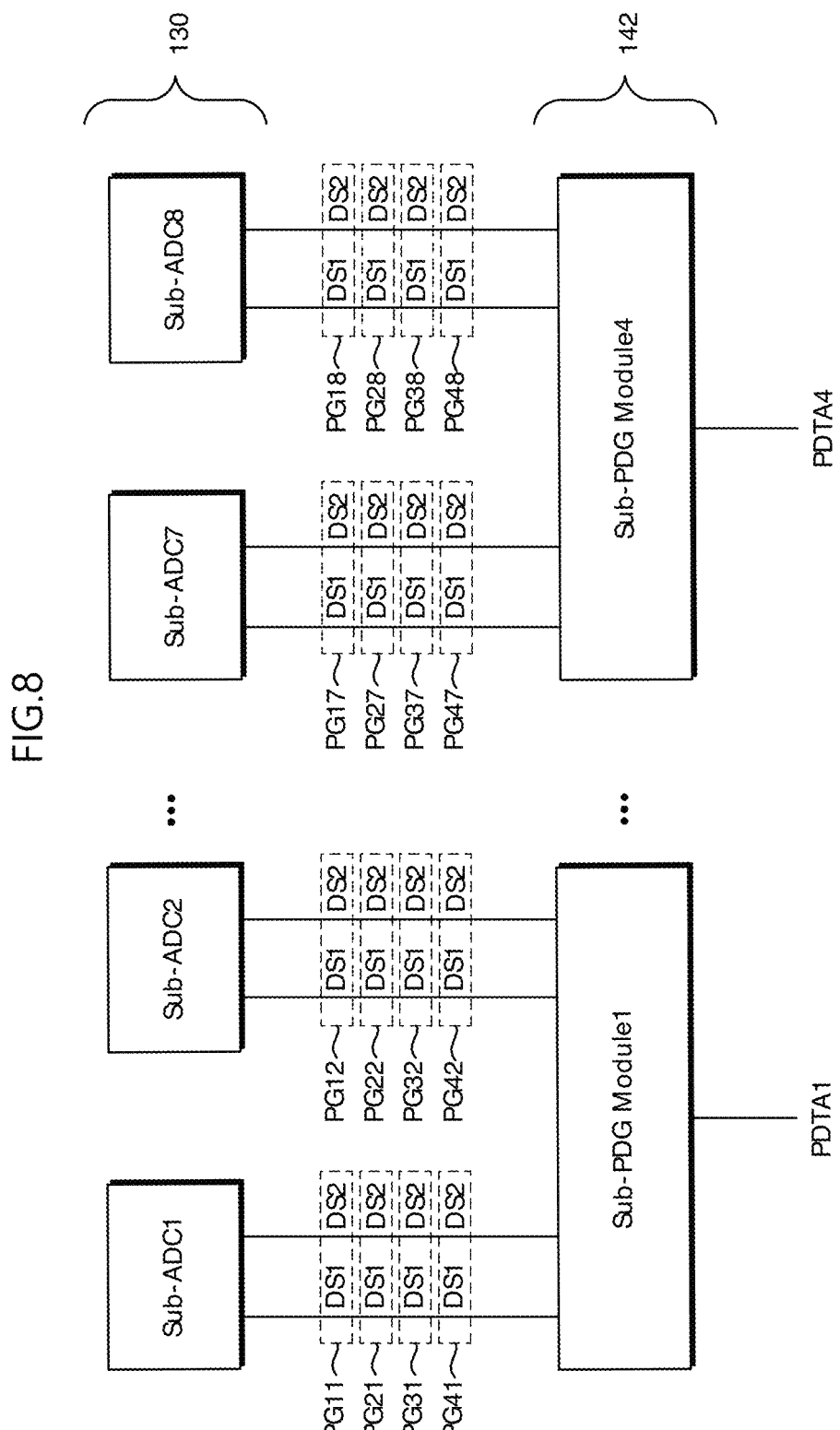

FIGS. 7 and 8 are diagrams illustrating that the image sensor 100A of FIG. 2 generates phase data. In detail, FIG. 7 shows an example of a method of setting a kernel in a full mode or a method of setting a kernel for another area other than an ROI area. FIG. 8 shows an example of generating phase data in a full mode or generating phase data for an area other than the ROI area (e.g., outside of the ROI area). For convenience of description, it is assumed that each kernel has a size of "4×2". Here, '4' means the number of rows and '2' means the number of columns.

Referring to FIG. 7, the number of pixel groups corresponding to the same color may be the same in each kernel such that a difference in a signal level due to color does not occur. For example, each of first to fourth kernels Kernel1 to Kernel4 may include four pixel groups corresponding to green (G). Also, each of the first to fourth kernels Kernel1 to Kernel4 may include two pixel groups corresponding to red (R) and two pixel groups corresponding to blue (B).

In a zoom area and/or another area other than an ROI area, the first to fourth kernels Kernel1 to Kernel4 may be set not to overlap each other. For example, the first kernel Kernel1 may include eight pixel groups PG11, PG12, PG21, PG22, PG31, PG32, PG41, and PG42, and the second kernel Kernel2 may include eight pixel groups PG13, PG14, PG23, PG24, PG33, PG34, PG43, and PG44. A pixel group belonging to the first kernel Kernel1 may not overlap a pixel group belonging to the second kernel Kernel2.

Referring to FIG. 8, the analog-to-digital converter 130 may include the first to eighth sub-analog-to-digital converters Sub-ADC1 to Sub-ADC8. The phase data generation module 142 may include first to fourth sub-phase data generation modules Sub-PDG Module1 to Sub-PDG Module4.

The first and second sub-analog-to-digital converters Sub-ADC1 and Sub-ADC2 and the first sub-phase data generation module Sub-PDG Module1 may operate to generate phase data corresponding to the first kernel Kernel1.

In detail, the first sub-analog-to-digital converter Sub-ADC1 may correspond to the first column and may sequentially receive the analog signals AS1 and AS2 from each of the pixel groups PG11, PG21, PG31, and PG41 in the first column. The first sub-analog-to-digital converter Sub-ADC1 may generate the digital signals DS1 and DS2 corresponding to each of the pixel groups PG11, PG21, PG31, and PG41 in the first column based on the received analog signals. Here, the first digital signals DS1 of each of the pixel groups PG11, PG21, PG31, and PG41 may include phase information corresponding to the left side of each pixel group. The second digital signals DS2 of each of the pixel groups PG11, PG21, PG31, and PG41 may include phase information corresponding to the right side of each pixel group. As in the above description, the second sub-analog-to-digital converter Sub-ADC2 may sequentially output the digital signals DS1 and DS2 corresponding to each pixel group PG12, PG22, PG32, and PG42 in the second column.

The first sub-phase data generation module Sub-PDG Module1 may sequentially receive the digital signals DS1 and DS2 corresponding to each of the pixel groups PG11, PG21, PG31, and PG41 in the first column and the digital signals DS1 and DS2 corresponding to each of the pixel group PG12, PG22, PG32, and PG42 in the second column. The first sub-phase data generation module Sub-PDG Module1 may perform a binning operation on the received digital signals and may generate first phase data PDTA1.

In a similar manner, second to fourth phase data PDTA2 to PDTA4 may be generated.

FIG. 9 is a diagram illustrating an example of a data set including image data generated in FIG. 6 and phase data generated in FIGS. 7 and 8.

Referring to FIG. 9, a data set may include first to fourth image data Image data1 to Image data4 and phase data Phase data. For example, the first image data Image data1 may be obtained by combining the image data IDTA11 to IDTA18 described in FIG. 6. The phase data Phase data may be obtained by combining the phase data PDTA1 to PDTA4 described in FIG. 8.

The number of kernels in a full mode is less than the number of kernels in a crop zoom mode. Accordingly, a ratio of a length of phase data to a length of image data may be smaller than a ratio in the crop zoom mode, which will be described below. For example, the image sensor 100A may be configured such that in a full mode (e.g., when pixels for a full image are being read or processed), a number of kernels and/or a ratio of an amount of phase data to an amount of image data for the full image are smaller than when in a crop zoom mode (e.g., when only pixels for a cropped or zoomed portion of the full image are being read or processed).

Also, in the situation where an ROI area is selected, the number of kernels for an area other than an ROI area may be smaller than (e.g., have a lower resolution than) the number of kernels for the ROI area. Accordingly, an amount of the phase data Phase data for a given pixel array size in the non-ROI area may be less than a length of the phase data for the same pixel array size in the ROI area.

Figure 10:
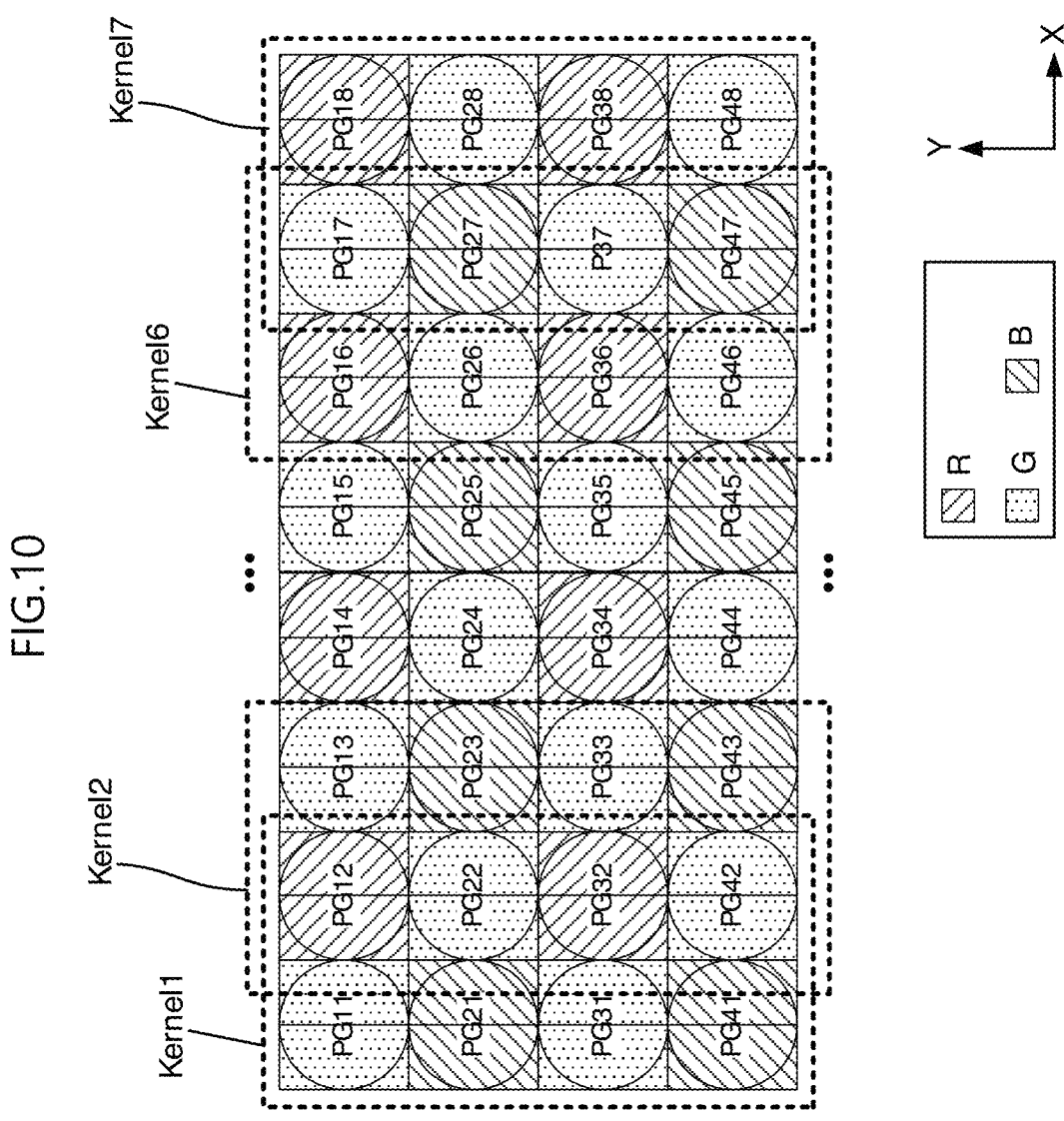
FIGS. 10 and 11 are diagrams illustrating that the image sensor 100A of FIG. 2 generates phase data in a crop zoom mode or generates phase data for an ROI area.
Figure 11:
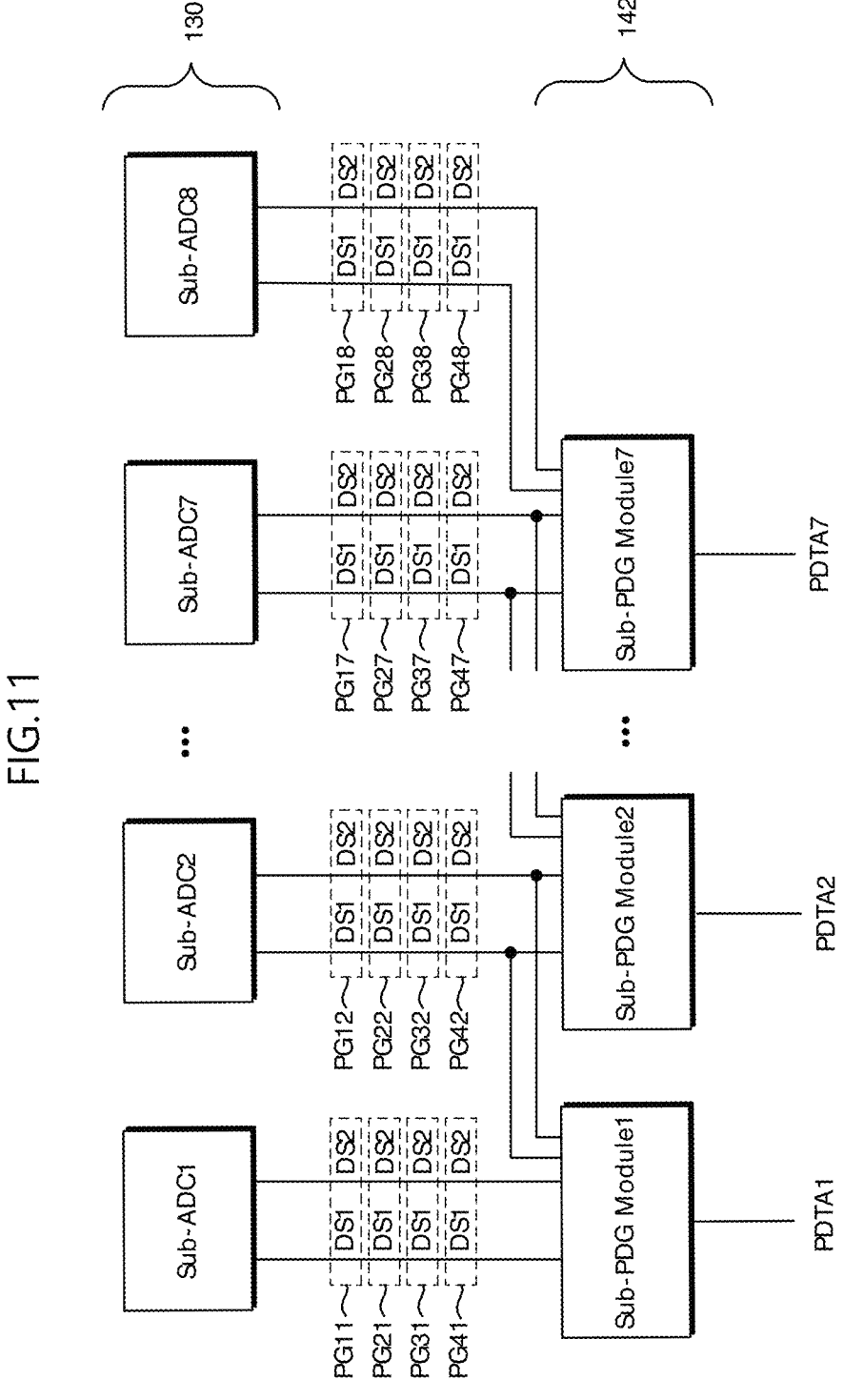

FIGS. 10 and 11 are diagrams illustrating that the image sensor 100A of FIG. 2 generates phase data in a crop zoom mode or generates phase data for an ROI area. In detail, FIG. 10 shows an example of a method of setting a kernel in a crop zoom mode or a method of setting a kernel for an ROI area. FIG. 11 shows an example of generating phase data for a zoom area or generating phase data for an ROI area by the image sensor 100A in a crop zoom mode. The configuration and operation of FIGS. 10 and 11 are similar to those of FIGS. 7 and 8. Accordingly, the same or similar components are described by using the same or similar reference numerals, and redundant descriptions will be omitted below. Moreover, for convenience of description, as in descriptions given with reference to FIGS. 7 and 8, it is assumed that each kernel has a size of "4×2".

Referring to FIG. 10, the number of pixel groups corresponding to the same color may be the same in each kernel such that a difference in a signal level due to color does not occur. For example, each of first to seventh kernels Kernel1 to Kernel7 may include four pixel groups corresponding to green (G), two pixel groups corresponding to red (R), and two pixel groups corresponding to blue (B).

The first to seventh kernels Kernel1 to Kernel7 may be set such that adjacent kernels overlap each other. For example, each of the first kernel Kernel1 and the second kernel Kernel2 may include the pixel groups PG12, PG22, PG32, and PG42 corresponding to a second column. Likewise, each of the second kernel Kernel2 and the third kernel Kernel3 may include the pixel groups PG13, PG23, PG33, and PG43 corresponding to a third column. As such, the number of kernels for a zoom area and/or an ROI area during a crop zoom mode may be increased to be greater than the number of kernels for another area or the zoom area or ROI area during a full mode, by setting adjacent kernels to overlap each other.

Referring to FIG. 11, the analog-to-digital converter 130 may include the first to eighth sub-analog-to-digital converters Sub-ADC1 to Sub-ADC8. The phase data generation module 142 may include first to seventh sub-phase data generation modules Sub-PDG Module1 to Sub-PDG Module7.

Because adjacent kernels do not overlap each other in FIG. 8, the output of one sub-analog-to-digital converter is used to generate one phase data. However, because adjacent kernels overlap each other in FIG. 11, the output of one sub-analog-to-digital converter may be used to generate two different pieces of phase data. For example, the output of the second sub-analog-to-digital converter Sub-ADC2 may be provided to the first sub-phase data generation module Sub-PDG Module1 and the second sub-phase data generation module Sub-PDG Module2 and may be used to generate the first phase data PDTA1 and the second phase data PDTA2. As such, because the output of one sub-analog-to-digital converter is used to generate two different pieces of phase data, the pieces of phase data PDTA1 to PDTA7 may be generated to be greater than pieces of phase data in FIG. 8.

Figure 12:
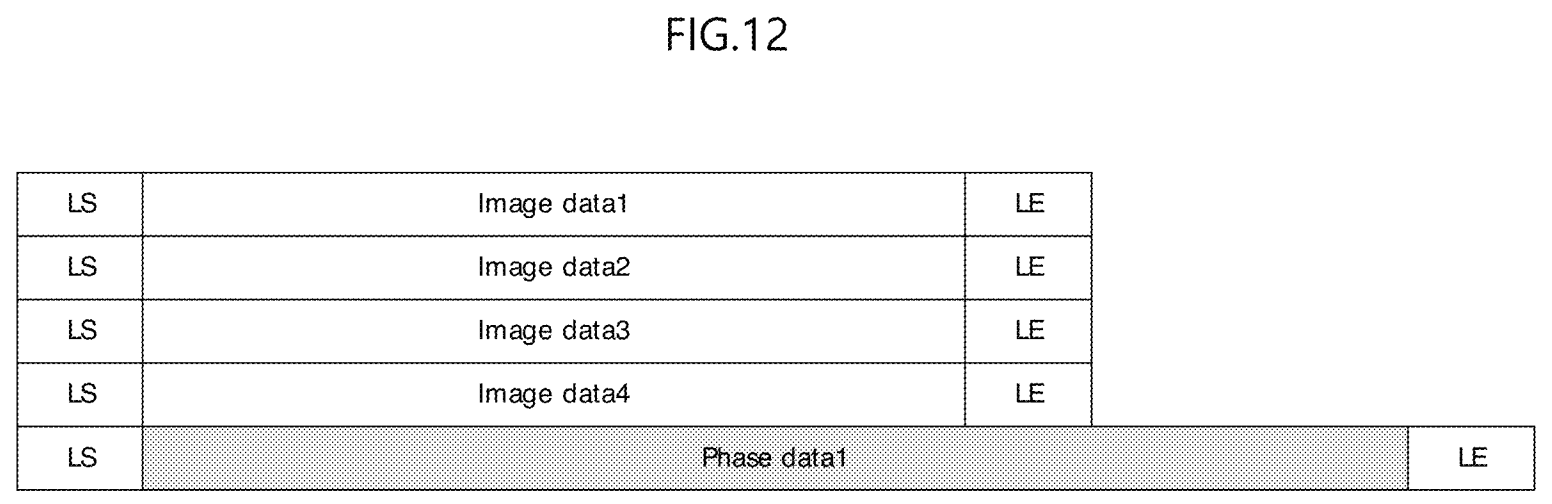

FIG. 12 is a diagram illustrating an example of a data set including phase data generated in FIGS. 10 and 11. For convenience of description, it is assumed that image data is the same as image data generated in FIG. 6.

Referring to FIG. 12, the phase data Phase data may be generated by combining the phase data PDTA1 to PDTA7 described in FIG. 11.

Because the number of kernels in a crop zoom mode for a particular set of pixels is greater than the number of kernels in a full mode for the particular set of pixels, a ratio of a length of phase data to a length of image data in the crop zoom mode may be greater than a ratio in the full mode, as shown in FIGS. 9 and 12.

Furthermore, because the number of kernels for an ROI area is greater than the number of kernels for an area other than the ROI area, a length of the phase data Phase data for the ROI area may be longer than a length of the phase data for an area other than the ROI area, as shown in FIGS. 9 and 12.

As described above with reference to FIGS. 2 to 12, the image sensor 100A according to an embodiment of the present disclosure may differently set the number of kernels based on target area information. In particular, for a particularly-sized pixel array, the number of kernels corresponding to the crop zoom mode and/or the ROI area may be greater than the number of kernels corresponding to a full mode and/or an area other than the ROI area, and thus high-resolution phase data may be generated.

[Image Sensor with Variable Length of Phase Data by Using Analog Signal]

Figure 13:
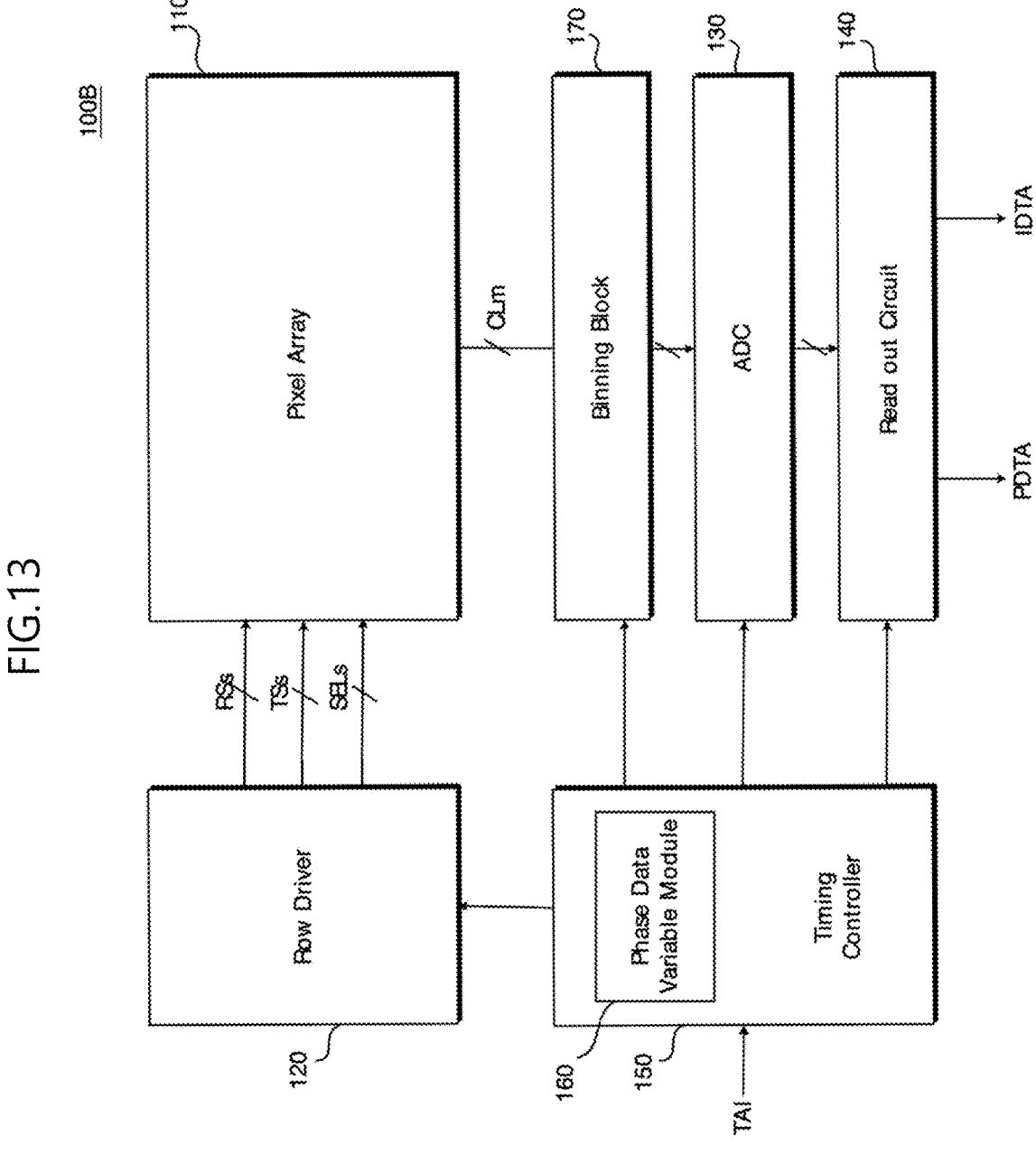
FIG. 13 is a block diagram illustrating another example of an image sensor 100B, according to an embodiment of the present disclosure.

FIG. 13 is a block diagram illustrating another example of an image sensor 100B, according to an embodiment of the present disclosure. The image sensor 100B of FIG. 13 is similar to the image sensor 100A of FIG. 2. Accordingly, the same or similar components are described by using the same or similar reference numerals, and redundant descriptions will be omitted below.

The image sensor 100A of FIG. 2 generates phase data by binning digital signals. On the other hand, the image sensor 100B of FIG. 13 may generate phase data by binning analog signals provided from the pixel array 110. To this end, the image sensor 100B may further include a binning block 170 arranged in front of the analog-to-digital converter 130. The binning block 170 may receive analog signals from the pixel array 110, may bin the analog signals, and may output the binned result.

Figure 14:
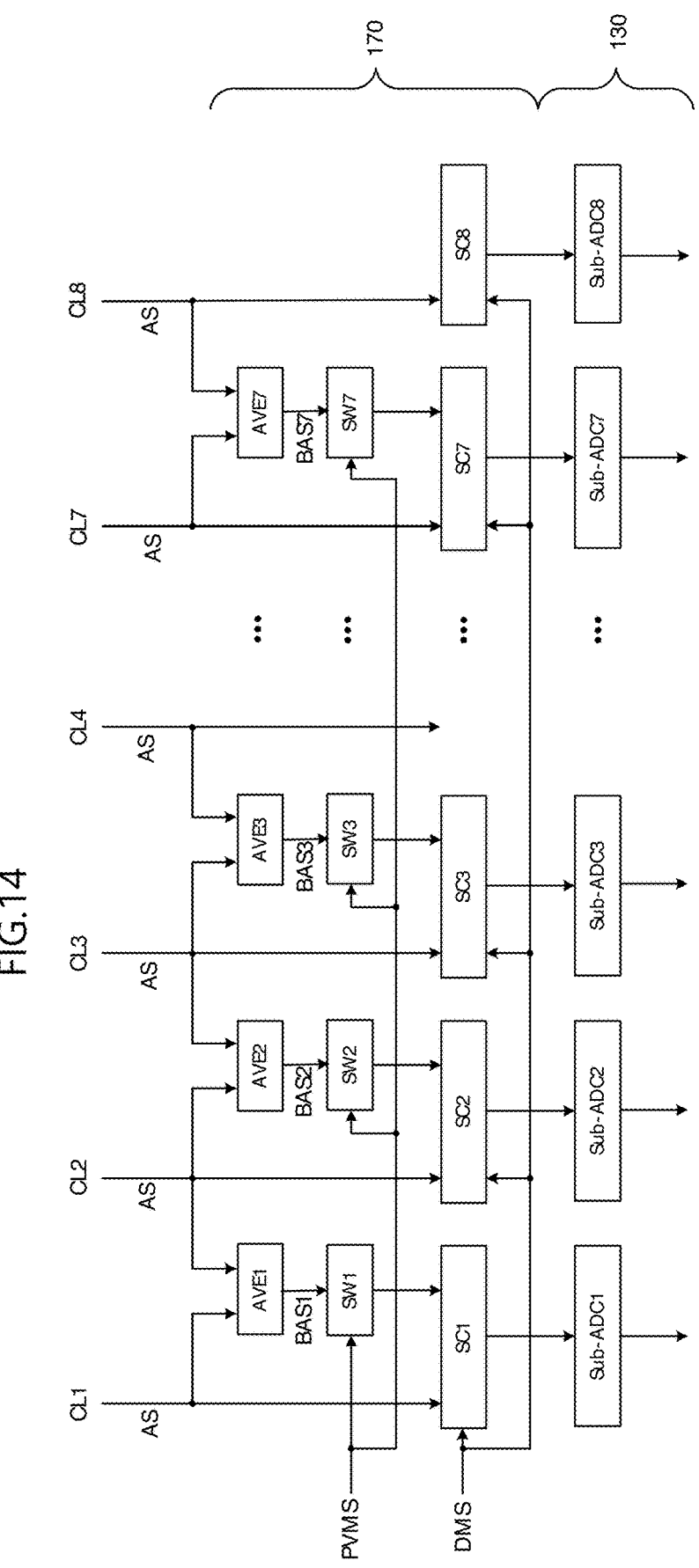
FIG. 14 is a diagram illustrating an example of the binning block 170 of FIG. 13 and the analog-to-digital converter 130 corresponding thereto.

FIG. 14 is a diagram illustrating an example of the binning block 170 of FIG. 13 and the analog-to-digital converter 130 corresponding thereto.

Referring to FIG. 14, the binning block 170 may include a plurality of averaging circuits AVE1 to AVE7, a plurality of switches SW1 to SW7, and a plurality of selection circuits SC1 to SC7.

Each of the plurality of averaging circuits AVE1 to AVE7 may be positioned between two column lines. For example, the first averaging circuit AVE1 may be positioned between a first column line CL1 and a second column line CL2, and the second averaging circuit AVE2 may be positioned between the second column line CL2 and a third column line CL3. In this case, analog signals provided through the second column line CL2 may be provided to the first averaging circuit AVE1 and the second averaging circuit AVE2.

Each of the plurality of averaging circuits AVE1 to AVE7 may receive an analog signal AS from a corresponding column line and may output a binning analog signal BAS by averaging the received analog signals. For example, the first averaging circuit AVE1 may receive analog signals from the first column line CL1 and the second column line CL2 and may output a first binning analog signal BAS1 by averaging the analog signals. For example, the second averaging circuit AVE2 may receive analog signals AS from the second column line CL2 and the third column line CL3 and may output a second binning analog signal BAS2 by averaging the analog signals AS.

The plurality of switches SW1 to SW7 may be turned on or off in response to a phase variable mode signal PVMS received from the phase data variable module 160. In an embodiment of the present disclosure, the number of switches turned on when a binning operation is performed on a zoom area and/or an ROI area may be greater than the number of switches turned on when a binning operation is performed on another area.

In more detail, only some of the plurality of switches SW1 to SW7 may be turned on such that analog signals received through one column line are used to generate one phase data when phase data for a full mode and/or another area other than the ROI area is generated. For example, when the size of a kernel is "4×2" as shown in FIG. 7, only one switch among two adjacent switches may be turned on.

In contrast, to cause more switches to be turned on than when phase data for a full mode or another area is generated, switches may be turned on such that analog signals received through one column line are used to generate at least two pieces of phase data when phase data for a crop zoom mode and/or an ROI area is generated. For example, when the size of a kernel is "4×2" as shown in FIG. 10, two adjacent switches may be turned on.

Each of the plurality of selection circuits SC1 to SC7 receives an analog signal from a corresponding column line and receives a binning analog signal from a corresponding averaging circuit. Each of the plurality of selection circuits SC1 to SC7 may select one of the analog signal provided from a column line or the binning analog signal provided from an averaging circuit in response to a data mode signal DMS. For example, when image data is generated, each of the plurality of selection circuits SC1 to SC7 may select the analog signal provided from a column line. For example, when phase data is generated, each of the plurality of selection circuits SC1 to SC7 may select the binning analog signal provided from an averaging circuit.

The plurality of sub-analog-to-digital converters Sub-ADC1 to Sub-ADC7 may correspond to the plurality of selection circuits SC1 to SC7, may convert the analog signal or the binning analog signal into a digital signal, and may output the digital signal.

Figure 15:
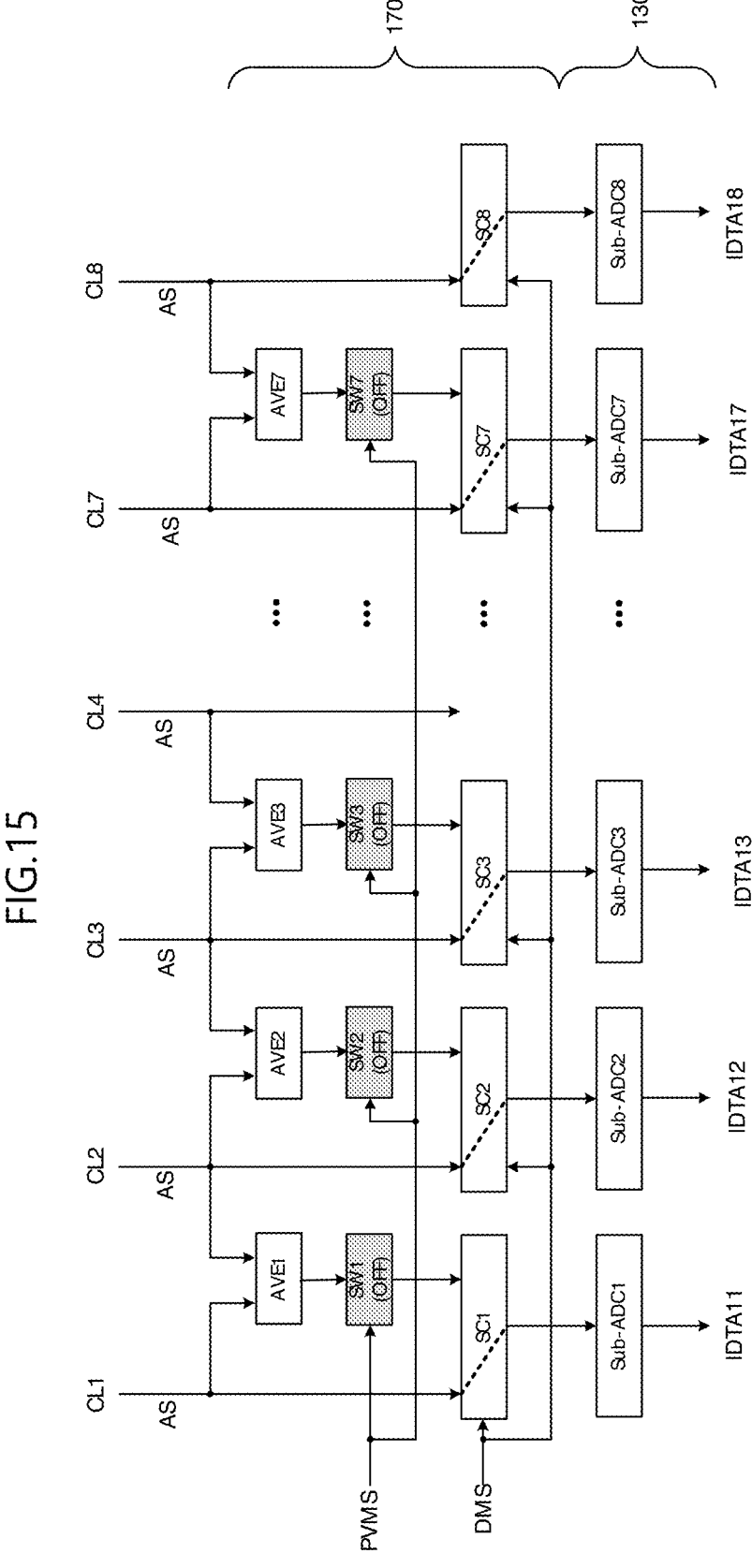
FIG. 15 is a diagram illustrating an example of an operation of the binning block 170 of FIG. 14 when image data is generated.

FIG. 15 is a diagram illustrating an example of an operation of the binning block 170 of FIG. 14 when image data is generated. For convenience of description, as described with reference to FIG. 6, FIG. 15 illustrates that image data is generated by analog signals generated from the pixel groups PG11 to PG18 arranged in the first row.

Referring to FIG. 15, all of the plurality of switches SW1 to SW7 may be turned off in response to the phase variable mode signal PVMS. In addition, each of the plurality of selection circuits SC1 to SC8 may be connected to a corresponding column line in response to the data mode signal DMS. In this case, each of the plurality of sub-analog-to-digital converters Sub-ADC1 to Sub-ADC8 may receive an analog signal from the corresponding column line. In this case, in one situation, phase information included in an analog signal corresponding to a pixel located on the left side of each pixel group and phase information included in an analog signal corresponding to a pixel located on the right side of each pixel group may cancel out in a process in which a sub-analog-to-digital converter sums the two pieces of phase information. Accordingly, the pieces of image data IDTA11 to IDTA18 may be generated.

Figure 16:
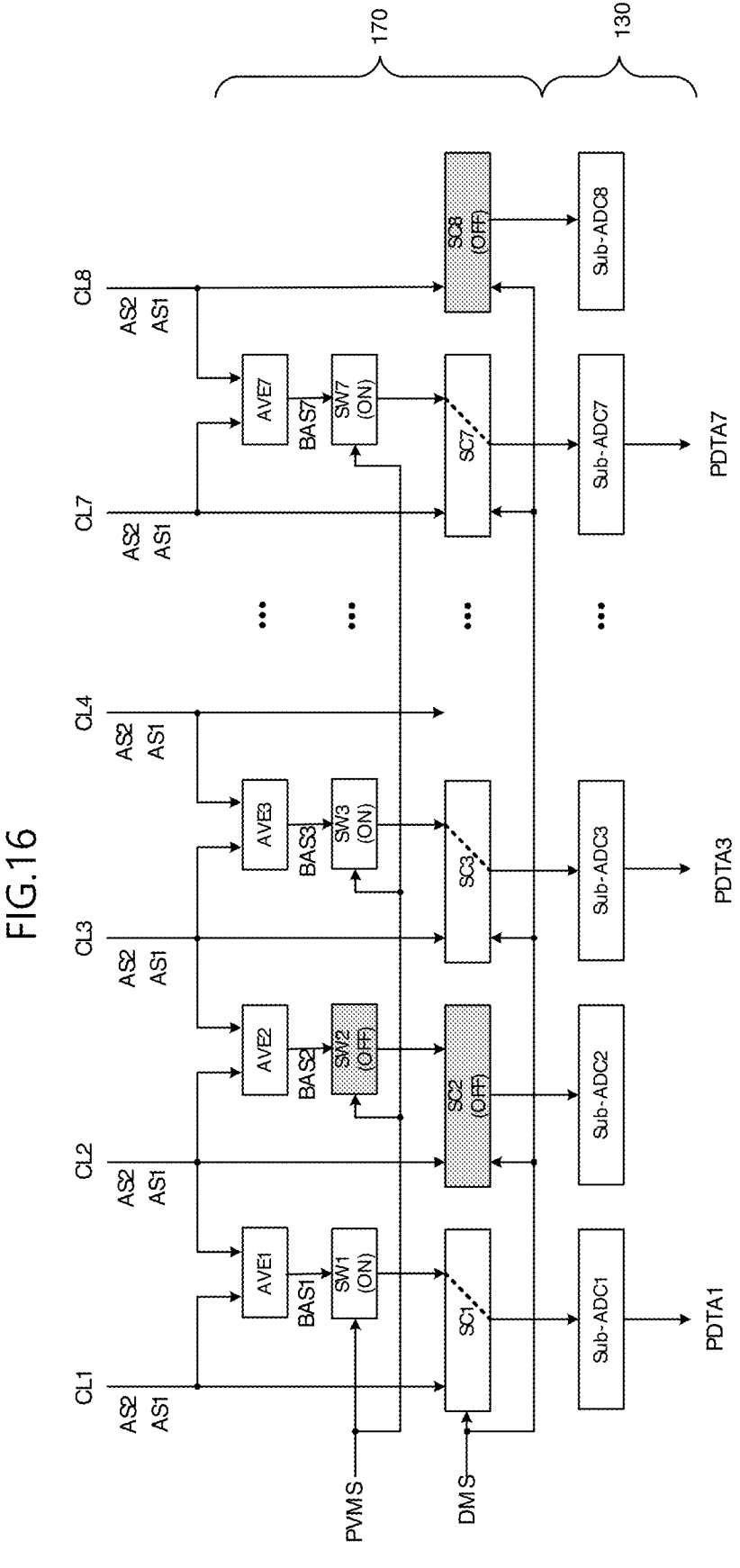
FIG. 16 is a diagram illustrating an example of an operation of the binning block 170 of FIG. 14 when phase data for a full mode and/or another area other than an ROI area is generated.

FIG. 16 is a diagram illustrating an example of an operation of the binning block 170 of FIG. 14 when phase data for a full mode and/or another area other than an ROI area is generated. For convenience of description, hereinafter, it is assumed that a kernel is set as shown in FIG. 7. Moreover, it is assumed that the transfer transistors TX of pixels arranged on the left side of each pixel group are first turned on to generate the first analog signal AS1, and then the transfer transistors TX of pixels arranged on the right side of each pixel group are turned on to generate the second analog signal AS2.

Referring to FIG. 16, each of the plurality of averaging circuits AVE1 to AVE7 may receive the first analog signal AS1 through the corresponding column line and may generate binning analog signals BAS1 to BAS7 by averaging the first analog signals AS1.

Only one of two adjacent switches among the plurality of switches SW1 to SW7 may be turned on in response to the phase variable mode signal PVMS. For example, only the first, third, fifth, and seventh switches SW1, SW3, SW5, and SW7 among the plurality of switches SW1 to SW7 may be turned on, and the other switches SW2, SW4, and SW6 thereof may be turned off.

The plurality of selection circuits SC1 to SC8 may be connected to switches, which are turned on, in response to the data mode signal DMS, respectively. For example, the first, third, fifth, and seventh selection circuits SC1, SC3, SC5, and SC7 among the plurality of selection circuits SC1 to SC8 are connected to the first, third, fifth and seventh switches SW1, SW3, SW5, and SW7, respectively. Accordingly, the binning analog signals BAS1, BAS3, BAS5, and BAS7, which are generated by the first, third, fifth, and seventh averaging circuits AVE1, AVE3, AVE5, and AVE7, may be respectively provided to corresponding sub-analog-to-digital converters and may be used to generate phase data. In the meantime, other binning analog signals BAS2, BAS4, and BASE may not be used to generate phase data.

In this case, column lines respectively corresponding to the first, third, fifth, and seventh binning analog signals BAS1, BAS3, BAS5, and BAS7 do not overlap each other. For example, because the first binning analog signal BAS1 corresponds to the first and second column lines CL1 and CL2, and the third binning analog signal BAS3 corresponds to the third and fourth column lines CL3 and CL4, column lines corresponding to the first and third binning analog signals BAS1 and BAS3 do not overlap each other. This means that kernels are capable of being set such that adjacent kernels do not overlap each other as shown in FIG. 7. In this manner, analog signals received through one column line are used to generate one phase data when phase data for a zoom area in a full mode and/or another area other than an ROI area is generated.

In a similar method, binning analog signals for the second analog signal AS2 corresponding to a pixel located on the right side of each pixel group may be generated, and each of the generated binning analog signals may be provided to a corresponding sub-analog-to-digital converter. Accordingly, as shown in FIG. 16, the four pieces of phase data PDTA1, PDTA3, PDTA5, and PDTA7 may be generated.

Figure 17:
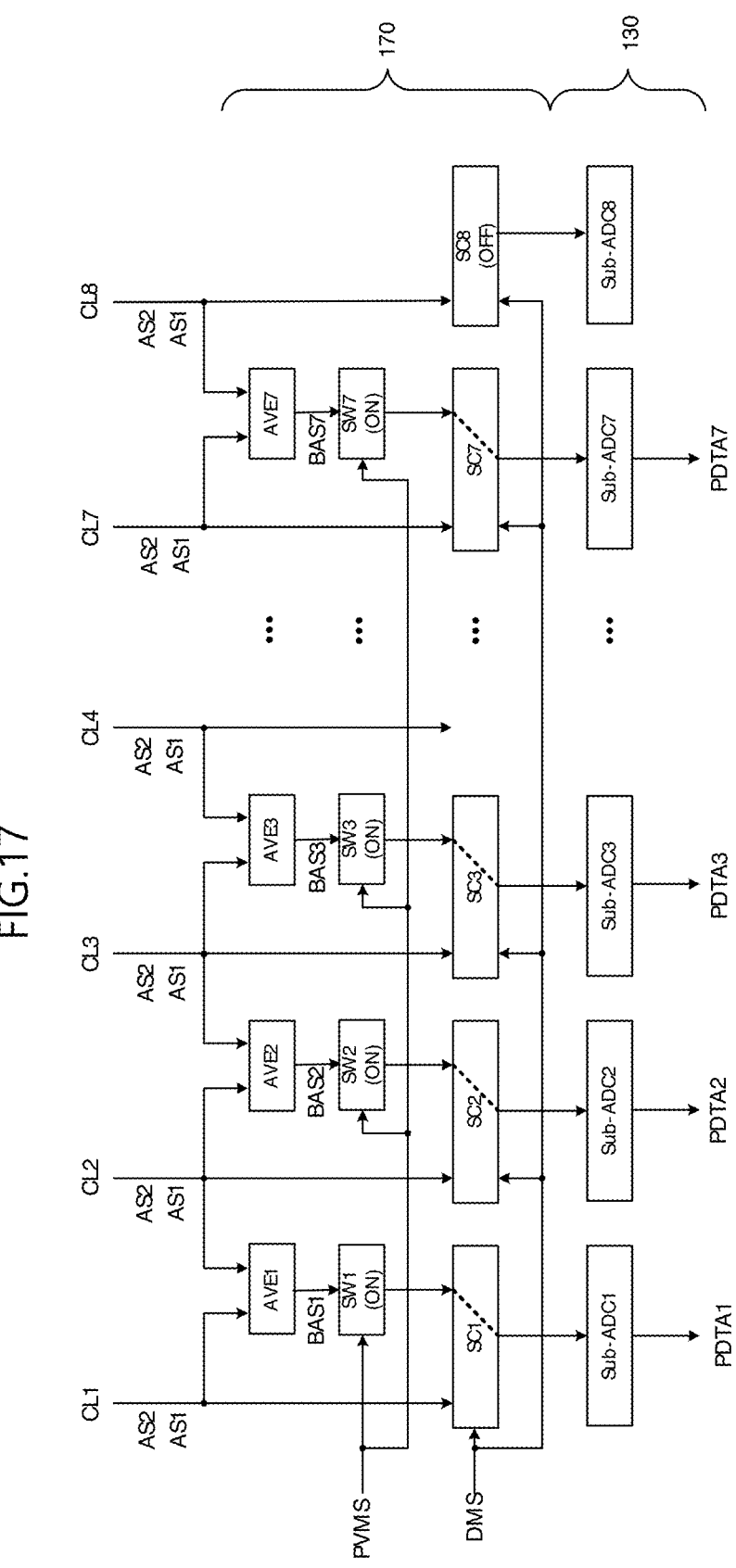
FIG. 17 is a diagram illustrating an example of an operation of the binning block 170 of FIG. 14 when phase data for a crop zoom mode and/or an ROI area is generated.

FIG. 17 is a diagram illustrating an example of an operation of the binning block 170 of FIG. 14 when phase data for a crop zoom mode and/or an ROI area is generated. For convenience of description, hereinafter, it is assumed that a kernel is set as shown in FIG. 10. Moreover, as illustrated in FIG. 16, it is assumed that the transfer transistors TX of pixels arranged on the left side of each pixel group are first turned on to generate the first analog signal AS1, and then the transfer transistors TX of pixels arranged on the right side of each pixel group are turned on to generate the second analog signal AS2.

Referring to FIG. 17, each of the plurality of averaging circuits AVE1 to AVE7 receives the first analog signal AS1 through the corresponding column line, and may generate the binning analog signals BAS1 to BAS7 by averaging the first analog signals AS1.

All of the plurality of switches SW1 to SW7 may be turned on in response to the phase variable mode signal PVMS. Accordingly, each of the binning analog signals BAS1 to BAS7 may be provided to the corresponding selection circuit.

The plurality of selection circuits SC1 to SC7 may be connected to corresponding switches in response to the data mode signal DMS, respectively. Accordingly, the binning analog signals BAS1 to BAS7 may be provided to corresponding sub-analog-to-digital converters, respectively. Accordingly, the first to seventh binning analog signals BAS1 to BAS7 generated by the first to seventh averaging circuits AVE1 to AVE7 are respectively provided to corresponding sub-analog-to-digital converters and may be used to generate phase data.

In this case, column lines corresponding to the binning analog signals BAS1 to BAS7 may overlap each other. For example, because the first binning analog signal BAS1 corresponds to the first and second column lines CL1 and CL2 and the second binning analog signal BAS2 corresponds to the second and third column lines CL2 and CL3, the analog signal received from the second column line CL2 may be redundantly used to generate the first and second binning analog signals BAS1 and BAS2. This means that kernels are capable of being set such that adjacent kernels overlap each other as shown in FIG. 10. In this manner, analog signals received through one column line may be used to generate two pieces of phase data when phase data for a zoom area and/or an ROI area is generated.

In the meantime, in a similar method, binning analog signals for the second analog signal AS2 corresponding to a pixel located on the right side of each pixel group may be generated, and each of the generated binning analog signals may be provided to a corresponding sub-analog-to-digital converter.

Accordingly, as shown in FIG. 17, the seven pieces of phase data PDTA1 to PDTA7, which is more than the pieces of phase data in FIG. 16, may be generated. As a result, high-resolution phase data may be generated.

As described above with reference to FIGS. 13 to 17, the image sensor 100B according to an embodiment of the present disclosure may vary a length of phase data depending on target area information. In detail, the image sensor 100B may generate high-resolution phase data for a crop zoom mode and/or an ROI area by setting the number of kernels corresponding to the crop zoom mode and/or the ROI area so as to be greater than the number of kernels corresponding to a full mode and/or an area other than the ROI area.

The description above is an example, but it may be understood that the scope and spirit of the present disclosure is not limited thereto. For example, a structure of a pixel array and a size of each kernel may be variously modified according to the embodiment. Hereinafter, various modifications according to an embodiment of the present disclosure will be described in detail.

[Modified Examples of Pixel Array Structure, Kernel Size, and Kernel Setting Method]

Figure 18:
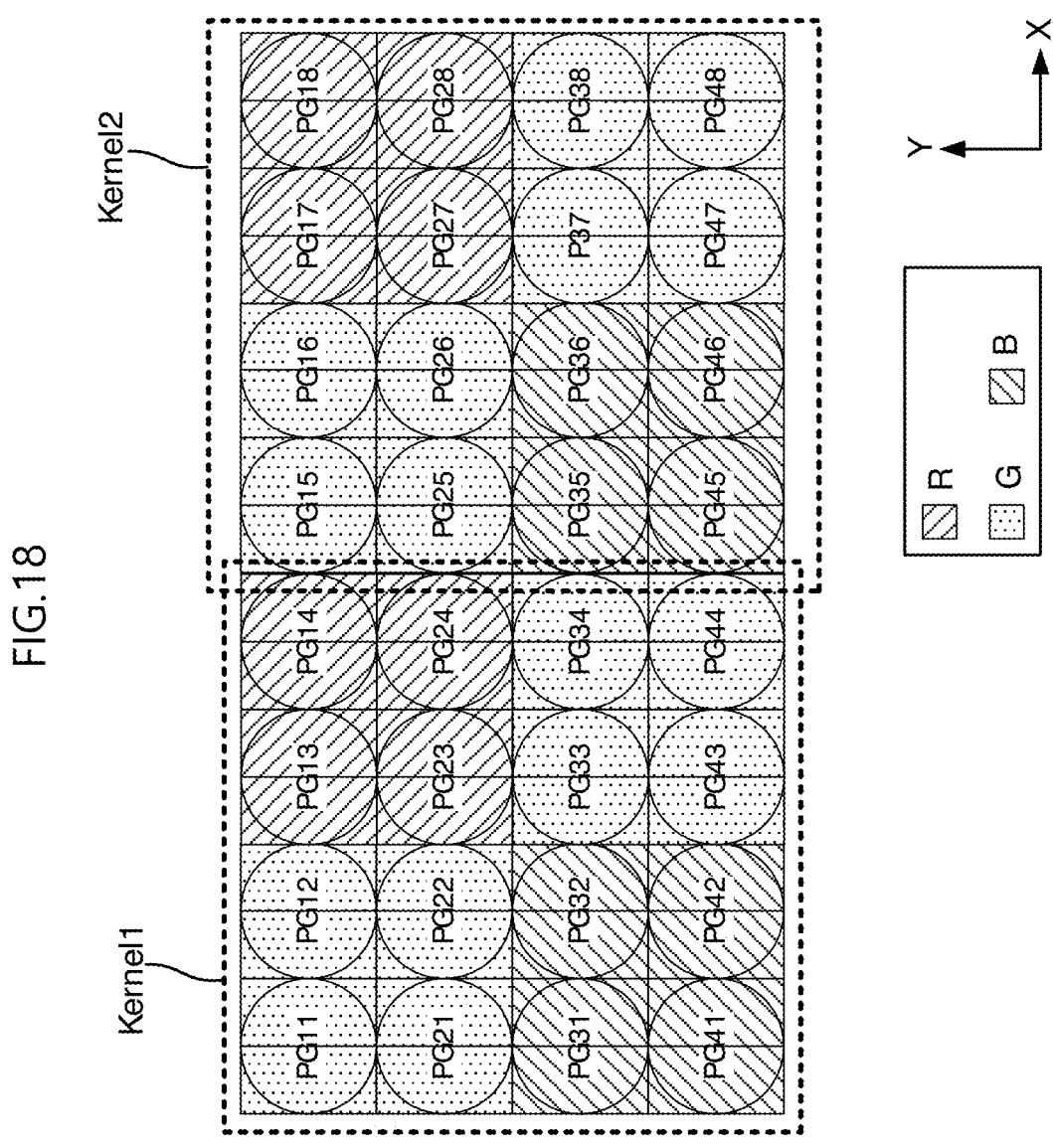
FIG. 18 is a diagram illustrating an example of a structure of a pixel array and a kernel setting method, according to another embodiment of the present disclosure.

FIG. 18 is a diagram illustrating an example of a structure of a pixel array and a kernel setting method, according to another embodiment of the present disclosure. FIG. 18 shows an example of a kernel when phase data for a full mode and/or an area other than an ROI area is generated.

Referring to FIG. 18, a pixel array may be formed such that four adjacent pixel groups correspond to the same color. For example, four pixel groups PG11, PG12, PG21, and PG22 adjacent to each other may correspond to green (G); four pixel groups PG13, PG14, PG23, and PG24 adjacent to each other may correspond to red (R); and four pixel groups PG31, PG32, PG41, and PG42 adjacent to each other may correspond to blue (B).

In this case, a size of a kernel may be set such that the number of pixel groups corresponding to the same color is the same in each kernel. For example, each kernel may be set to have a size of "4×4" as shown in FIG. 18. When phase data for a zoom area in a full mode and/or another area other than the ROI area is generated, the first kernel Kernel1 and the second kernel Kernel2 may be set not to overlap each other.

Figure 19:
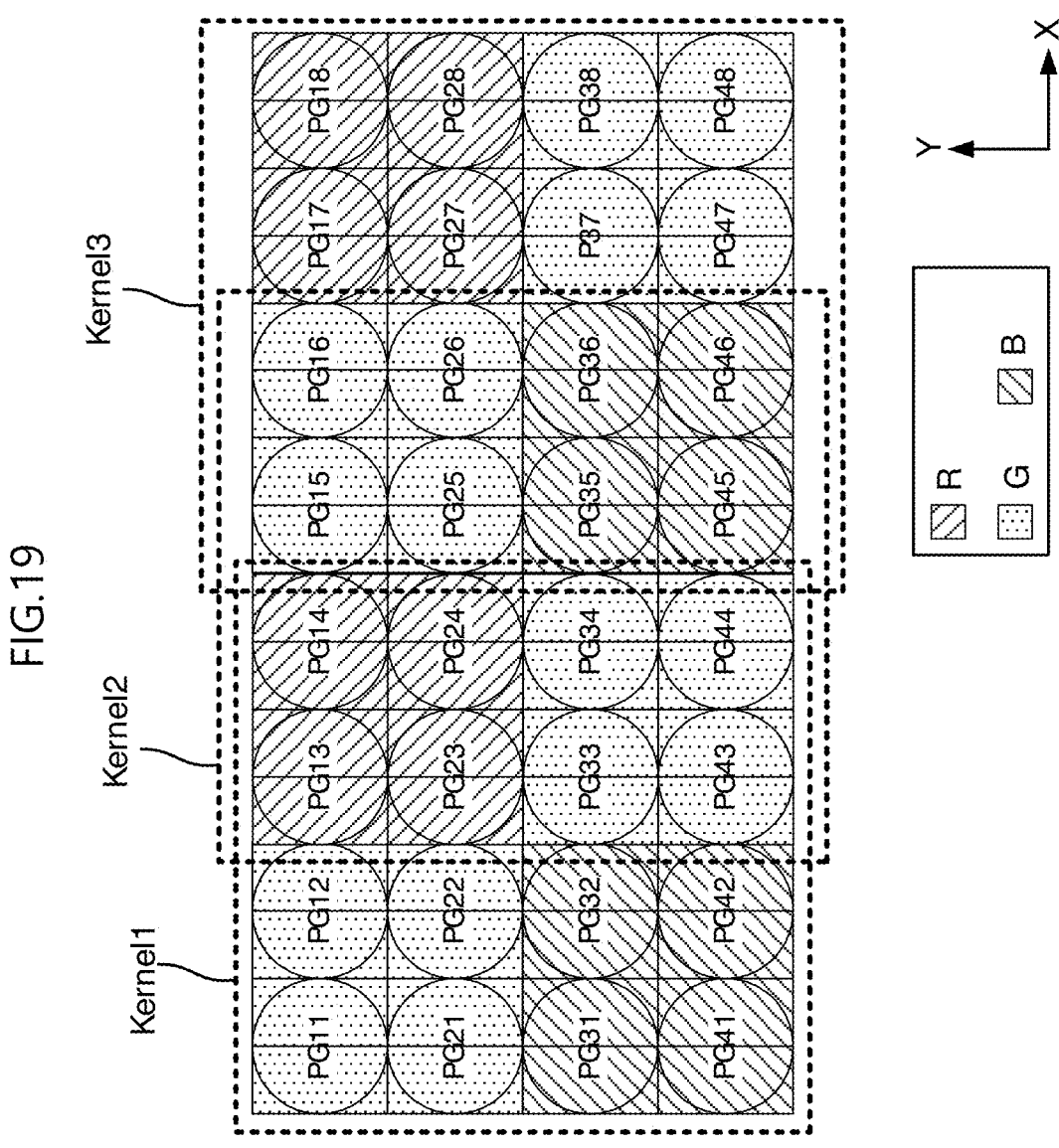
FIG. 19 is a diagram illustrating an example of a method of setting a kernel when phase data for a crop zoom mode and/or an ROI area is generated.

FIG. 19 is a diagram illustrating an example of a method of setting a kernel when phase data for a crop zoom mode and/or an ROI area is generated. For convenience of description, it is assumed that a pixel structure of FIG. 19 is the same as that of FIG. 18.

Referring to FIG. 19, each kernel may have a size of "4×4" and may be set to move by 2 in a first direction (X-axis direction). In this case, the number of pixel groups corresponding to green (G) included in the first kernel Kernel1, the number of pixel groups corresponding to green (G) included in the second kernel Kernel2, and the number of pixel groups corresponding to green (G) included in the third kernel Kernel3 are the same as each other. The number of pixel groups corresponding to red (R) included in the first kernel Kernel1, the number of pixel groups corresponding to red (R) included in the second kernel Kernel2, and the number of pixel groups corresponding to red (R) included in the third kernel Kernel3 are the same as each other. The number of pixel groups corresponding to blue (B) included in the first kernel Kernel1, the number of pixel groups corresponding to blue (B) included in the second kernel Kernel2, and the number of pixel groups corresponding to blue (B) included in the third kernel Kernel3 are the same as each other. Accordingly, a difference in a signal level due to color may not occur. The number of kernels for a zoom area and/or an ROI area of FIG. 19 is greater than that for another area of FIG. 18. Accordingly, high-resolution phase data may be generated with respect to the zoom area and/or the ROI area.

Figure 20:
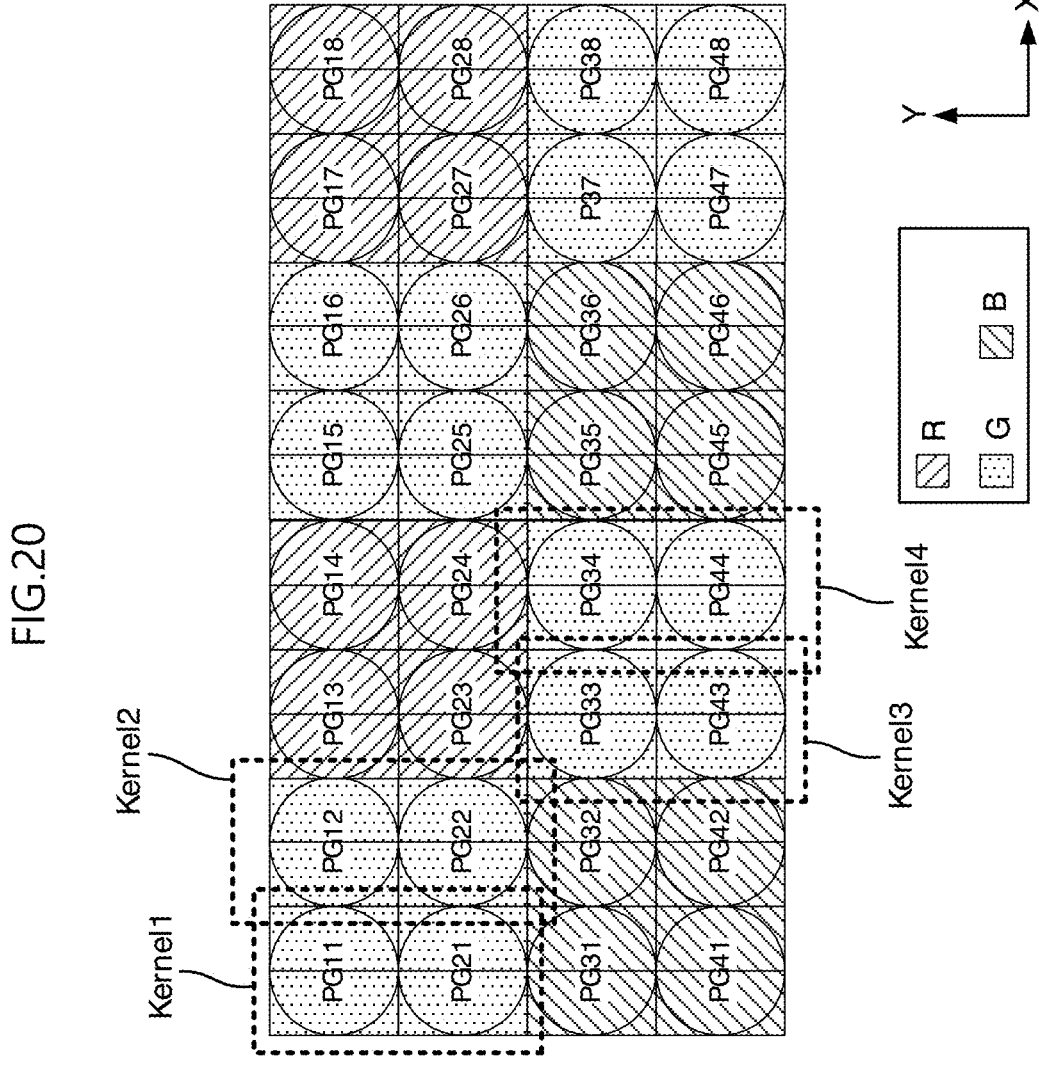
FIG. 20 is a diagram illustrating another example of a method of setting a kernel when phase data for a crop zoom mode and/or an ROI area is generated.

FIG. 20 is a diagram illustrating another example of a method of setting a kernel when phase data for a crop zoom mode and/or an ROI area is generated. For convenience of description, it is assumed that a pixel structure of FIG. 20 is the same as that of FIG. 18.

Referring to FIG. 20, a size of a kernel corresponding to a zoom area and/or an ROI area may be set to be smaller than a size of a kernel corresponding to another area. For example, when phase data for a crop zoom mode and/or an ROI area is generated, each kernel may be set to have a size of "2×1". In this case, colors of pixel groups included in each kernel may be the same as each other. For example, as shown in FIG. 20, all pixel groups included in each kernel may correspond to green (G).

Moreover, when phase data for a crop zoom mode and/or an ROI area is generated, each kernel may be set in a zigzag manner. For example, the first and second kernels Kernel1 and Kernel2 may be respectively arranged in the first and second columns and may be arranged to be spaced by 1 in the first direction (X-axis direction). The third and fourth kernels Kernel3 and Kernel4 may be respectively arranged in the third and fourth columns and may be arranged to be spaced by 1 in the first direction (X-axis direction). In this case, the number of kernels for the crop zoom mode and/or the ROI area of FIG. 20 is greater than the number of kernels for the full mode or for another area of FIG. 18. Accordingly, high-resolution phase data may be generated with respect to the crop zoom mode and/or the ROI area.

Figure 21:
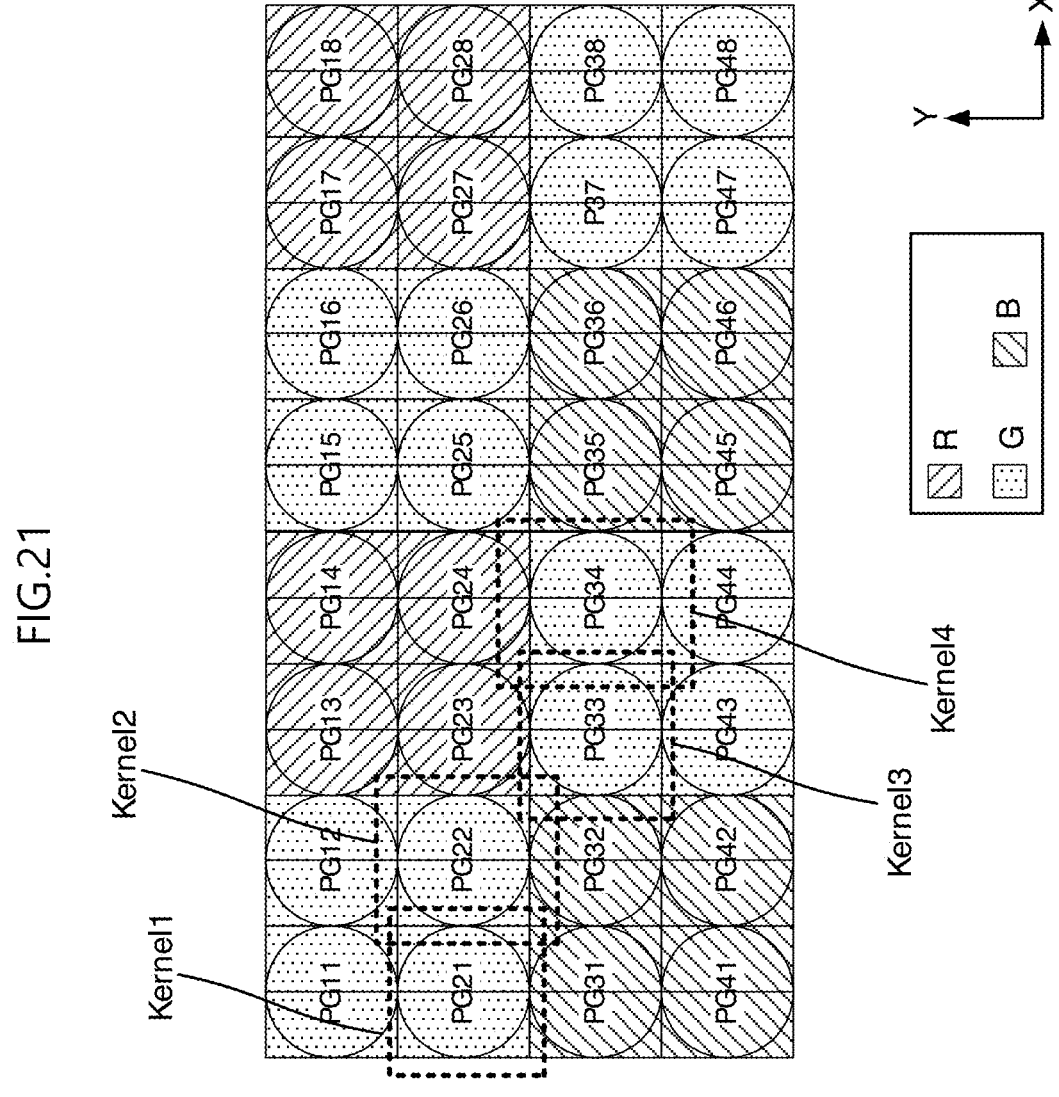
FIG. 21 is a diagram illustrating another example of a method of setting a kernel when phase data for a crop zoom mode and/or an ROI area is generated.

FIG. 21 is a diagram illustrating another example of a method of setting a kernel when phase data for a crop zoom mode and/or an ROI area is generated. A method of setting a kernel of FIG. 21 is similar to that of FIG. 20. Accordingly, redundant descriptions will be omitted below.

Referring to FIG. 21, in a high-resolution mode, each kernel may be set to have a size of "1×1". In this case, the first and second kernels Kernel1 and Kernel2 may be arranged in the second row, and the third and fourth kernels Kernel3 and Kernel4 may be arranged in the third row. In this case, the number of kernels for the crop zoom mode and/or the ROI area of FIG. 21 is greater than the number of kernels for the full mode or another area of FIG. 18. Accordingly, high-resolution phase data may be generated with respect to the crop zoom mode and/or the ROI area.

Figure 22:
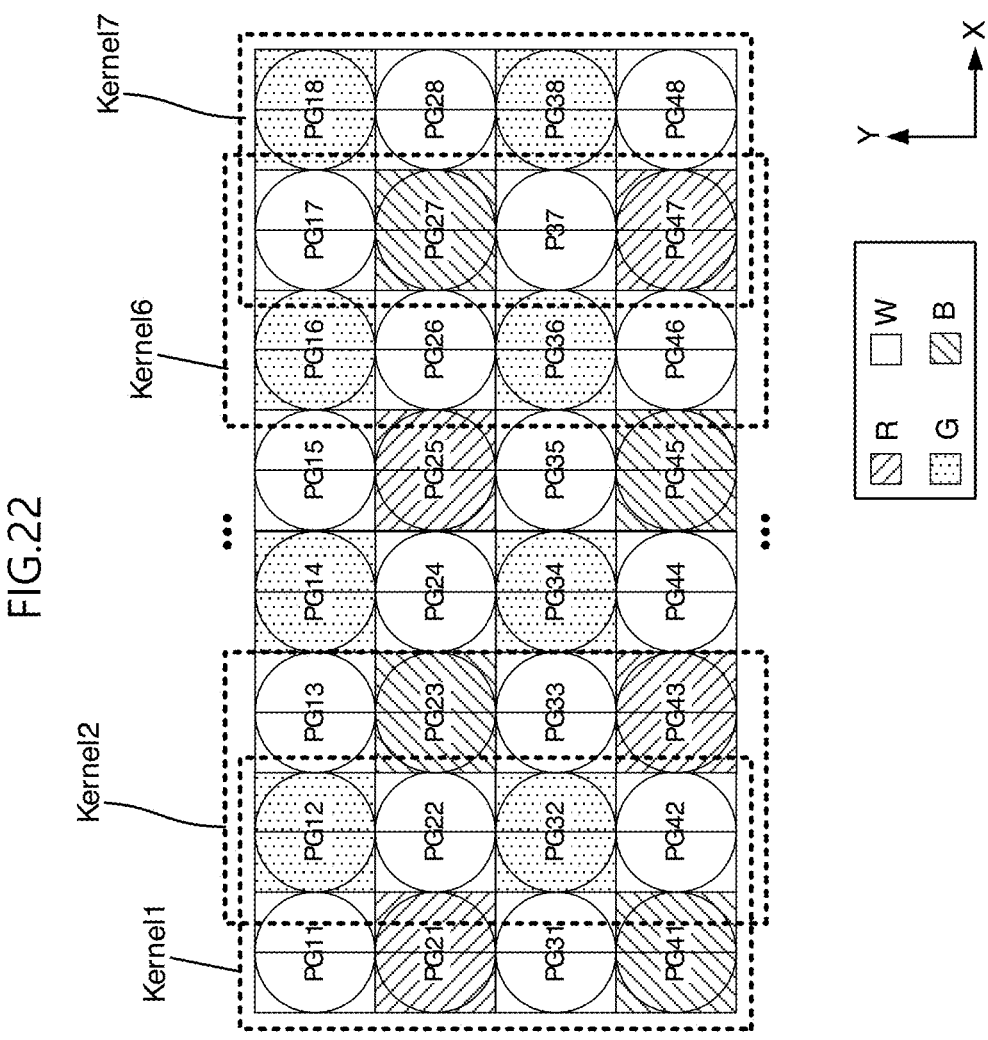
FIG. 22 is a diagram illustrating an example of a structure of a pixel array and a kernel setting method, according to another embodiment of the present disclosure.

FIG. 22 is a diagram illustrating an example of a structure of a pixel array and a kernel setting method, according to another embodiment of the present disclosure. FIG. 22 shows an example of a kernel when phase data for a crop zoom mode and/or an ROI area is generated. A method of setting a kernel of FIG. 22 is similar to that of FIG. 10. Accordingly, redundant descriptions will be omitted below.

Referring to FIG. 22, a color filter may further include a color filter of white (W) for sensing a white color. For example, the pixel groups PG11, PG22, PG31, and PG42 may include a color filter of white (W); the pixel groups PG12 and PG32 may include a color filter of green (G); the pixel group PG21 may include a color filter of red (R); and, the pixel group PG41 may include a color filter of blue (B).

In this case, the number of pixel groups corresponding to the same color may be the same in each kernel such that a difference in a signal level due to color does not occur. For example, each of the first to seventh kernels Kernel1 to Kernel7 may include four pixel groups corresponding to white (W), two pixel groups corresponding to green (G), one pixel group corresponding to red (R), and one pixel group corresponding to blue (B).

When phase data for a crop zoom mode and/or an ROI area is generated, the first to seventh kernels Kernel1 to Kernel7 may be set such that adjacent kernels overlap each other. Accordingly, high-resolution phase data may be generated. In a full mode, kernels for the pixel arrangement in FIG. 22 may not overlap, such that only first through fourth kernels would be used.

Figure 23:
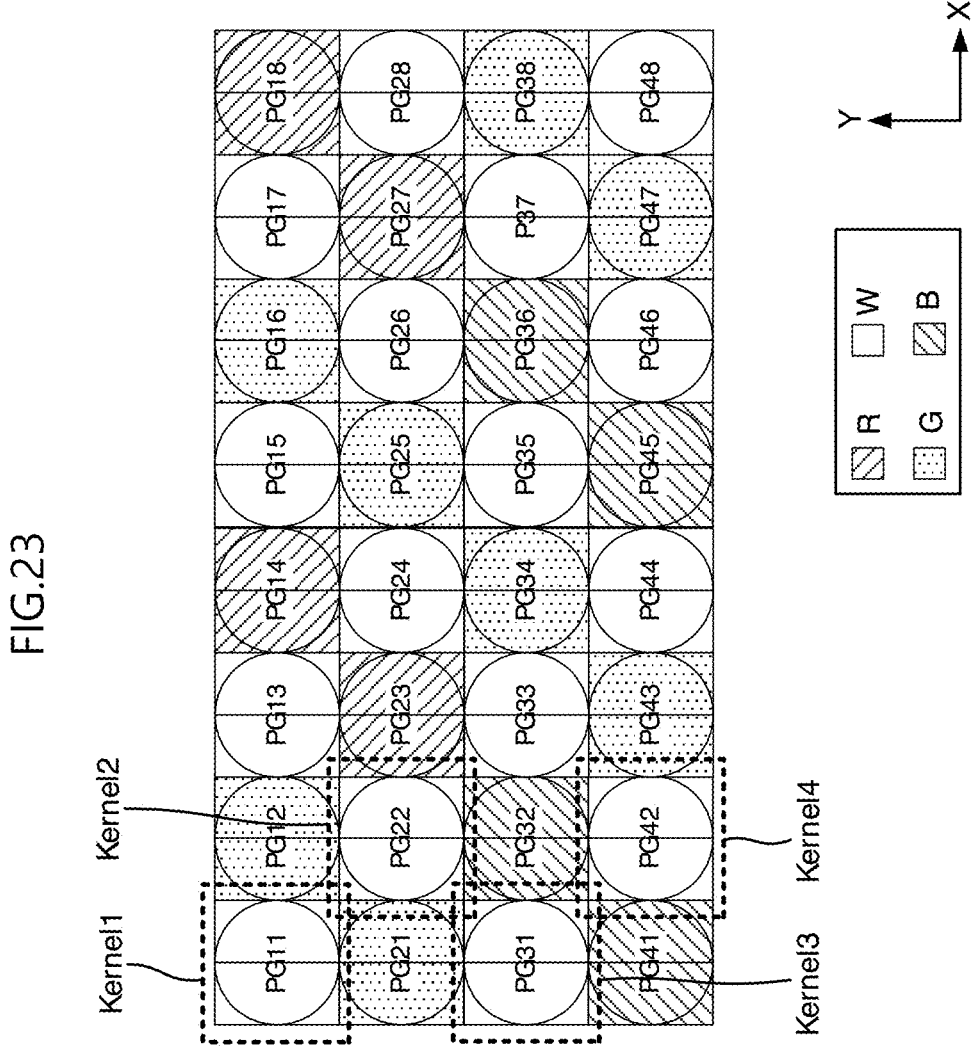
FIG. 23 is a diagram illustrating another example of a method of setting a kernel when phase data for a crop zoom mode and/or an ROI area is generated.

FIG. 23 is a diagram illustrating another example of a method of setting a kernel when phase data for a crop zoom mode and/or an ROI area is generated. A pixel arrangement in FIG. 23 is the same as that of FIG. 22. Accordingly, redundant descriptions will be omitted below.

Referring to FIG. 23, when phase data for a crop zoom mode and/or an ROI area is generated, each kernel may be set to have a size of "1×1". Also, each kernel may be set in a zigzag manner. For example, the first kernel Kernel1 may be positioned in a first row and a first column; the second kernel Kernel2 may be positioned in a second row and a second column; the third kernel Kernel3 may be positioned in a third row and the first column; and, the fourth kernel Kernel4 may be positioned in a fourth row and the second column. As such, the number of kernels for the crop zoom mode and/or the ROI area of FIG. 23 is even greater than the number of kernels in FIG. 18, by setting kernels in a zigzag manner. Accordingly, high-resolution phase data may be generated with respect to the crop zoom mode and/or the ROI area.

Figure 24:
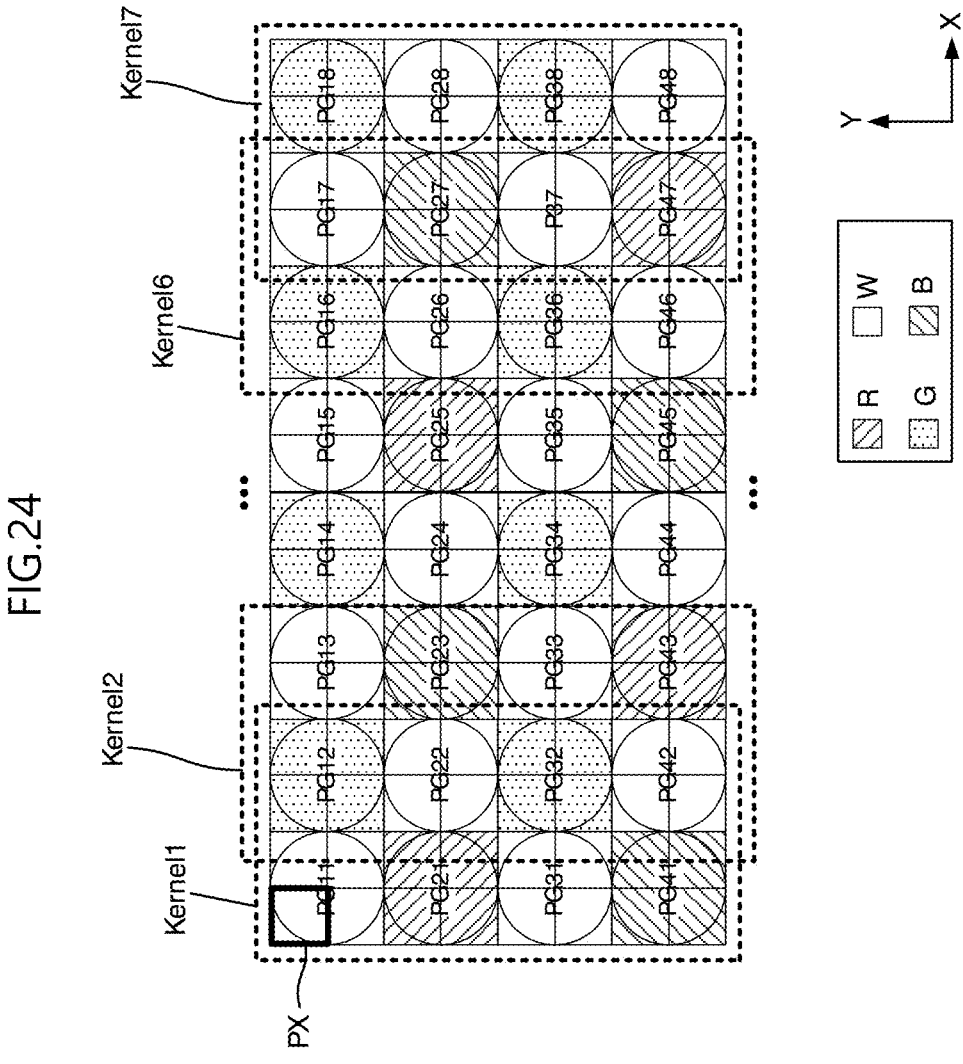
FIG. 24 is a diagram illustrating an example of a structure of a pixel array and a kernel setting method, according to another embodiment of the present disclosure.
Figure 25:
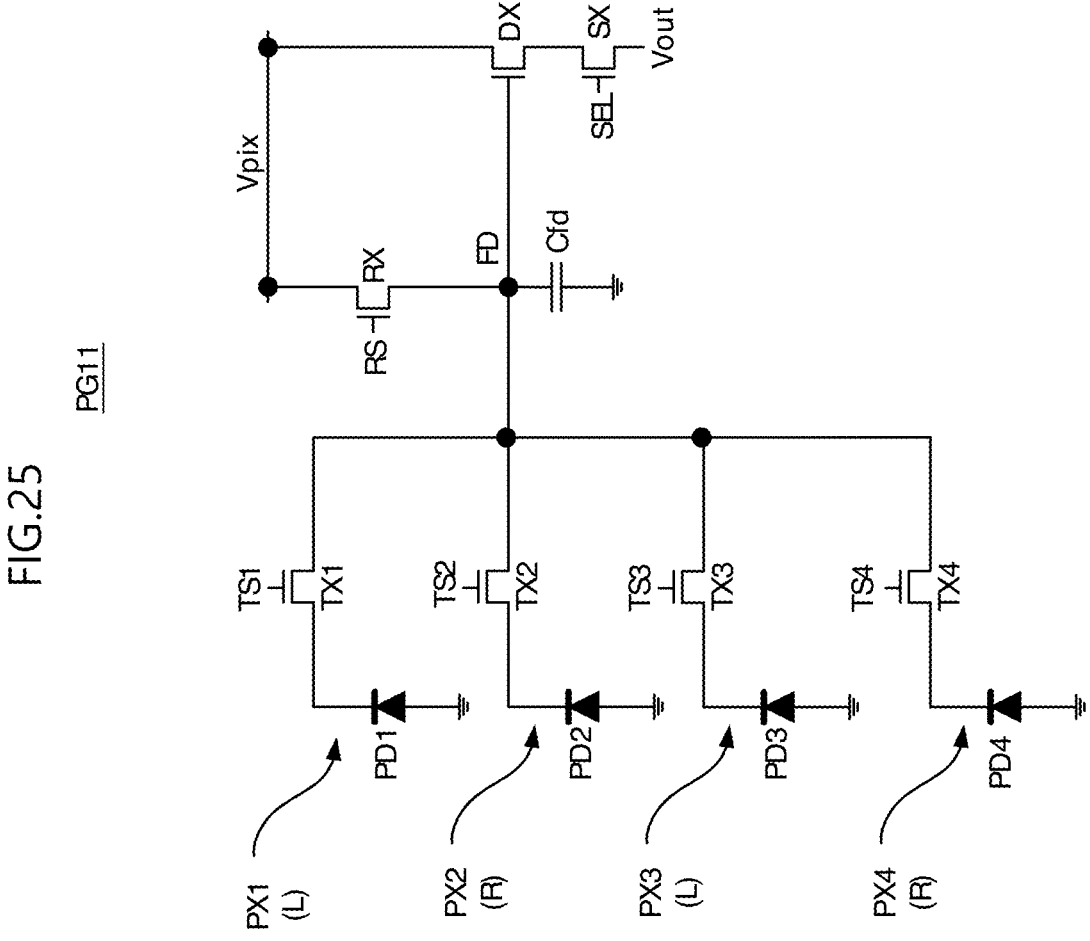
FIG. 25 is a diagram illustrating an example of the pixel group PG11 of FIG. 24.

FIG. 24 is a diagram illustrating an example of a structure of a pixel array and a kernel setting method, according to another embodiment of the present disclosure. FIG. 25 is a diagram illustrating an example of the pixel group PG11 of FIG. 24. A structure of a pixel array of FIG. 25 and a method of setting a kernel are similar to those of FIG. 22. Accordingly, redundant descriptions will be omitted below.

Each pixel group of FIG. 22 may include two pixels. On the other hand, each pixel group of FIG. 24 may include four pixels. For example, as illustrated in FIG. 25, the pixel group PG11 may include first to fourth pixels PX1 to PX4 that share the floating diffusion area FD with one another. In this case, as illustrated in FIG. 25, the first and third pixels PX1 and PX3 may be arranged on the left, and the second and fourth pixels PX2 and PX4 may be arranged on the right side.

The number of pixel groups corresponding to the same color may be the same in each kernel. When phase data for a zoom area and/or an ROI area is generated, the first to seventh kernels Kernel1 to Kernel7 may be set such that adjacent kernels overlap each other. Accordingly, high-resolution phase data may be generated.

Figure 26:
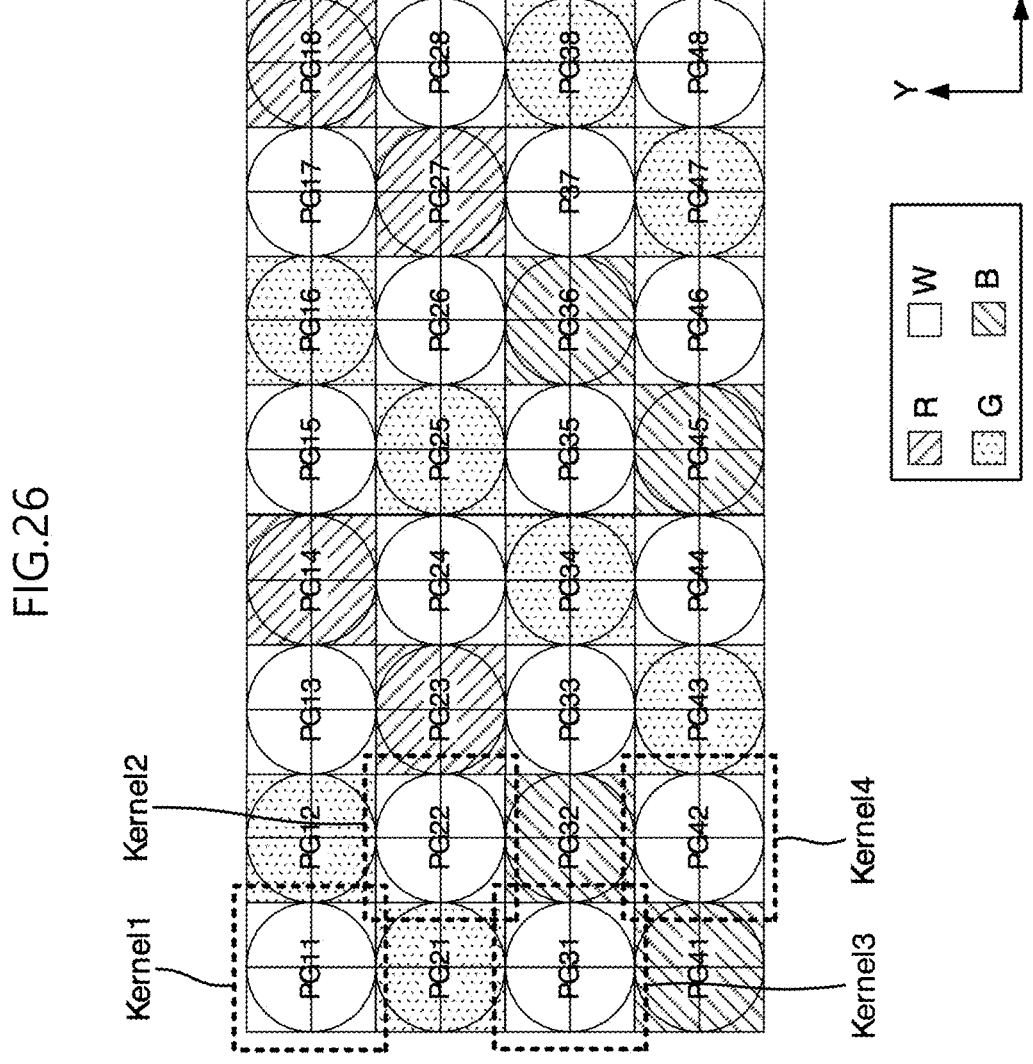
FIG. 26 is a diagram illustrating another example of a method of setting a kernel when phase data for a crop zoom mode and/or an ROI area is generated.

FIG. 26 is a diagram illustrating another example of a method of setting a kernel when phase data for a crop zoom mode and/or an ROI area is generated. A method of setting a kernel of FIG. 26 is similar to that of FIG. 24. Accordingly, redundant descriptions will be omitted below.

Referring to FIG. 26, when phase data for a crop zoom mode and/or an ROI area is generated, each kernel may be set to have a size of "1×1". Also, each kernel may be set in a zigzag manner. When kernels are set in the zigzag method, the number of kernels for the crop zoom mode and/or the ROI area may be greater than the number of kernels set in any other manner. Accordingly, high-resolution phase data may be generated.

[Image Sensor Supporting Digital Zoom or ROI Operation]

Figure 27:
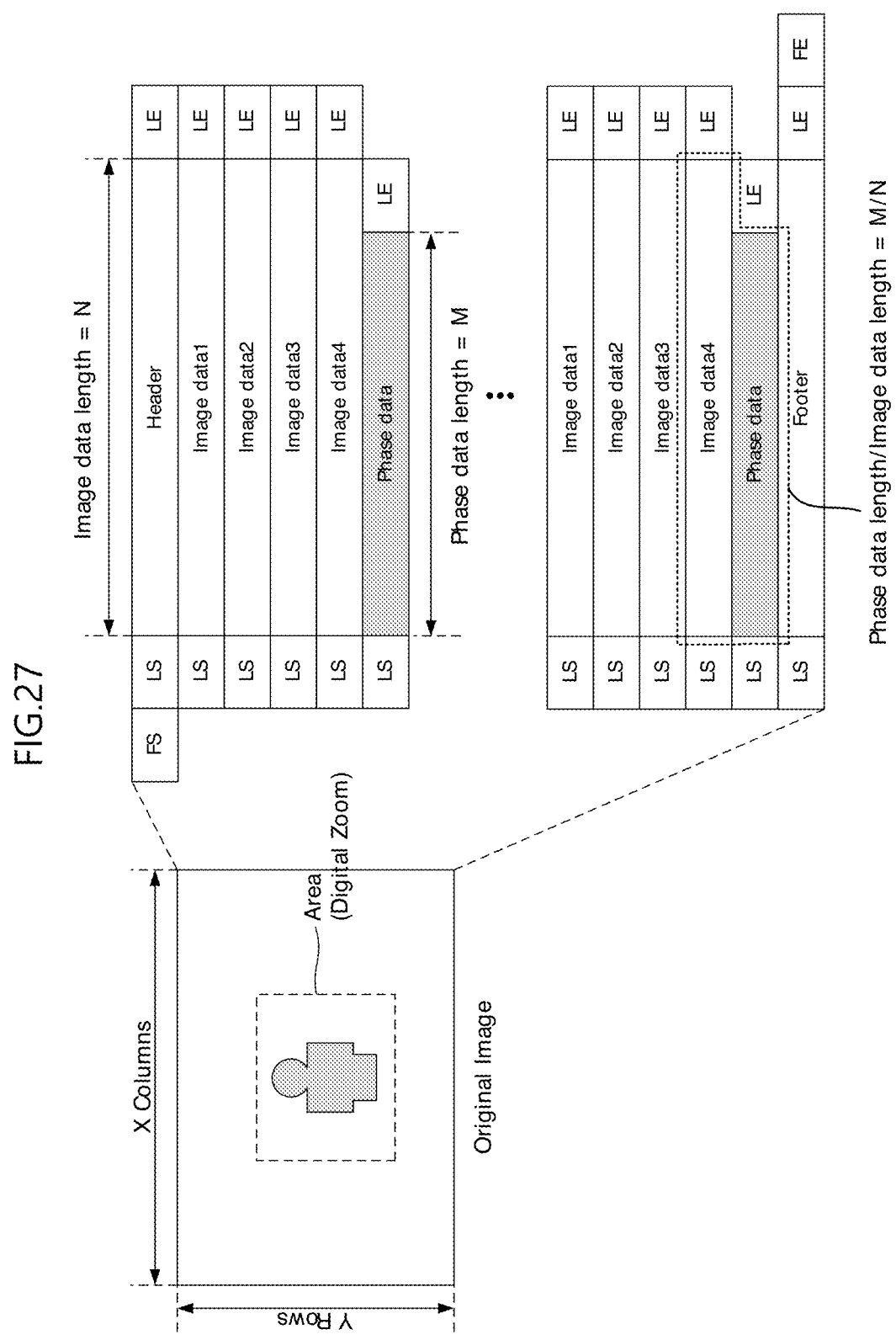
FIGS. 27 to 29 are diagrams for describing an example of an image sensor with a variable length of phase data during a digital zoom operation.
Figure 28:
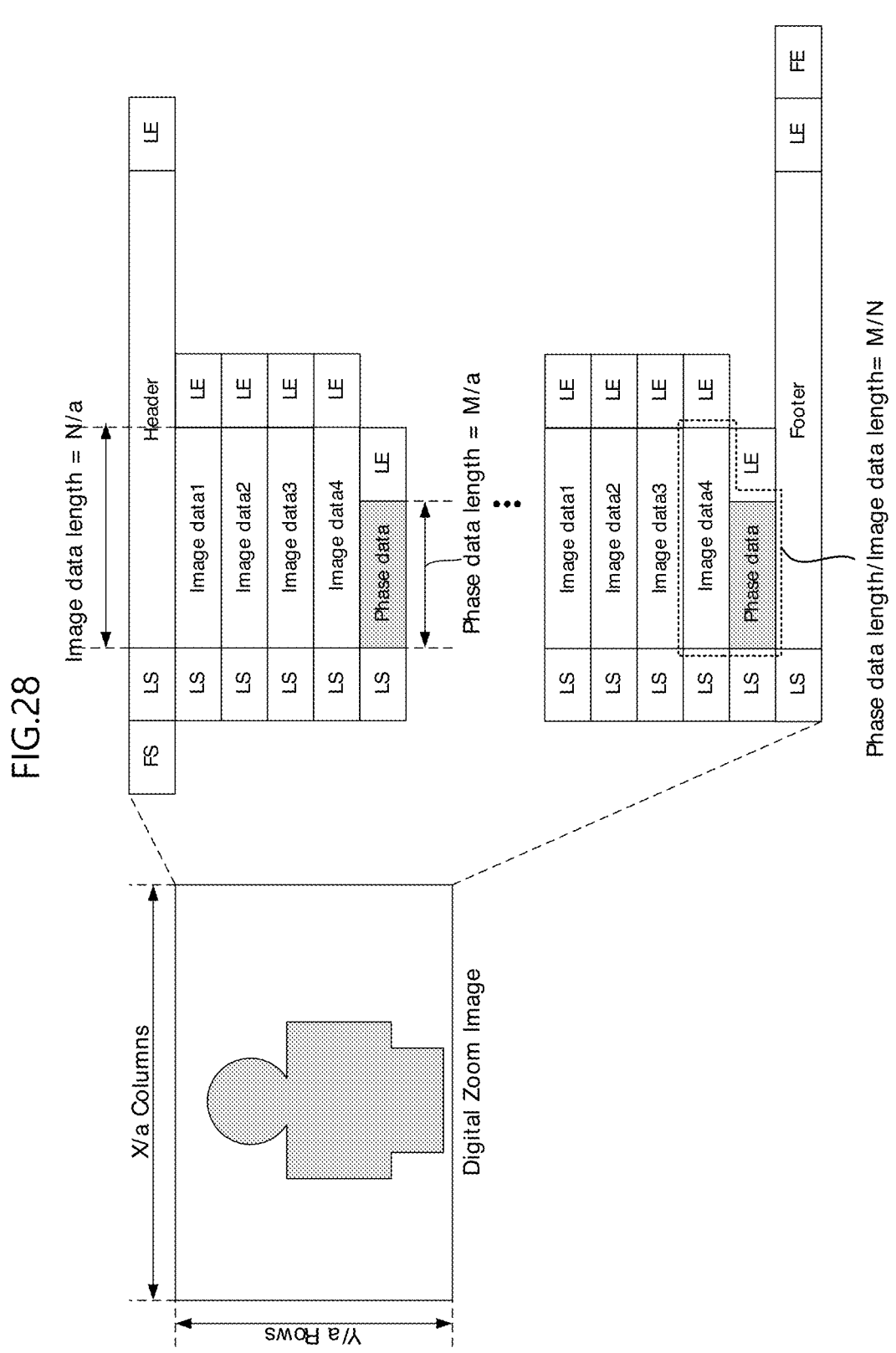
Figure 29:
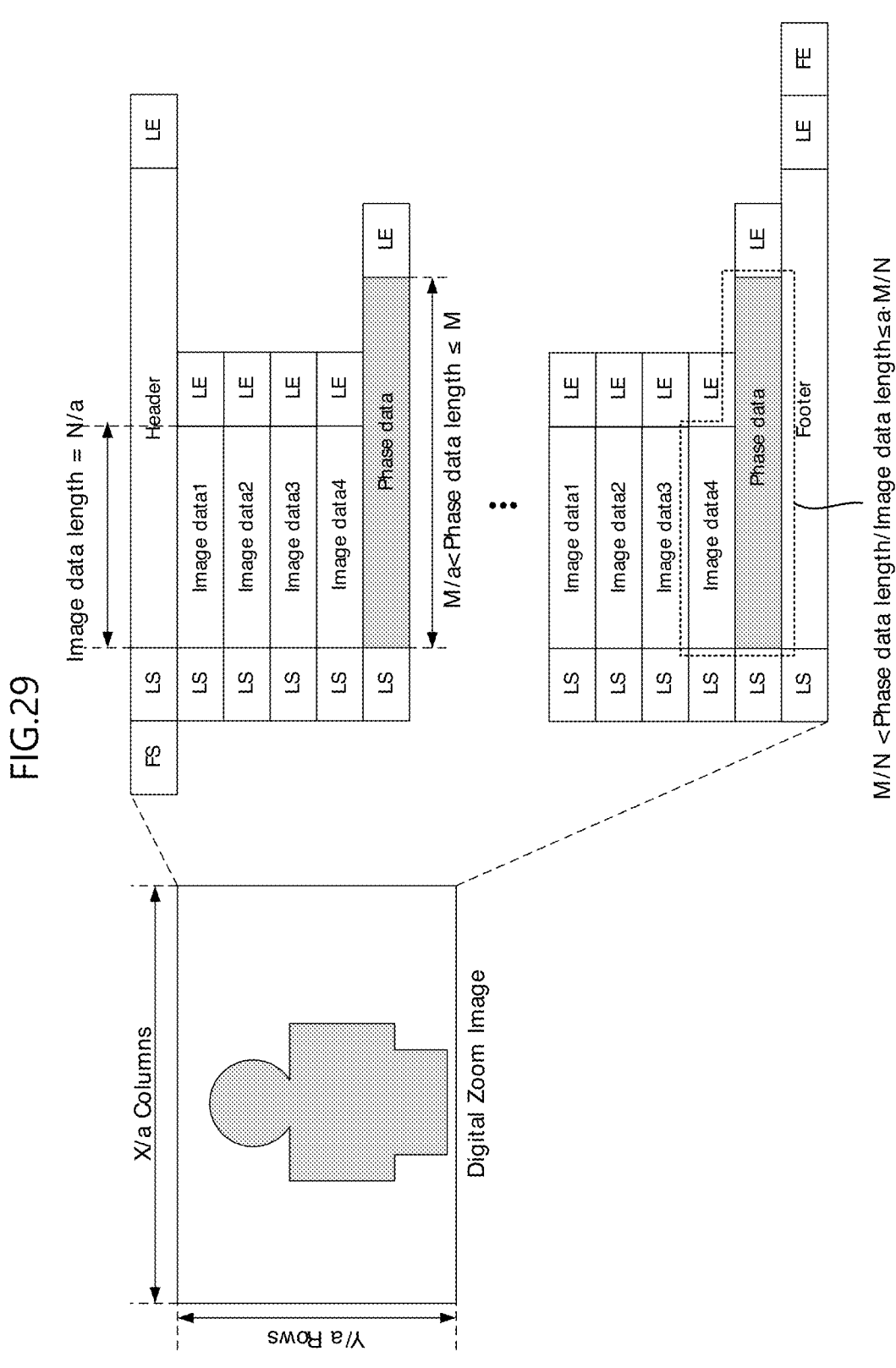

FIGS. 27 to 29 are diagrams for describing an example of an image sensor with a variable length of phase data during a digital zoom operation. In detail, FIG. 27 is a diagram illustrating an original image and a data set corresponding thereto. FIG. 28 is a diagram illustrating an example of a general data set in a crop zoom mode. FIG. 29 is a diagram illustrating an example of a data set in which a length of phase data is increased by an image sensor according to an embodiment of the present disclosure in a crop zoom mode.

Referring to FIG. 27, the original image may correspond to 'X' column lines and 'Y' row lines. As a result of generating a data set by the image sensor, image data having a length of 'N' and phase data having a length of 'M' may be generated. In this case, a ratio (i.e., phase data/image data) of a length of phase data to a length of image data may be 'M/N'.

Referring to FIG. 28, during a digital zoom operation, an image sensor operates in a crop zoom mode for reading out only a zoom area to be enlarged. The reading out of only the zoom area to be enlarged may include pixel data to be displayed on a display screen and/or pixel data to be stored upon taking of a picture or video, and in either case, may include pixel data to be processed for the image. In this case, in the case of a general image sensor, the length of phase data for the pixel data to be processed, in the crop zoom mode, has a length of 'M' similarly to the length of phase data in a full mode. Accordingly, assuming that the magnification of a digital zoom is 'a', image data and phase data are scaled to 'N/a' and 'M/a', respectively. In this case, because the resolution of disparity is reduced when the phase data is output while being scaled to be the same as image data, it is disadvantageous in terms of auto focusing (AF). In the meantime, in this case, a ratio (i.e., phase data/image data) of a length of phase data to a length of image data may be 'M/N', and may be the same as a ratio in a full mode.

Referring to FIG. 29, the image sensor according to an embodiment of the present disclosure may increase the length of phase data in a crop zoom mode. For example, an image sensor according to an embodiment of the present disclosure may vary the length of the phase data in the crop zoom mode so as to be greater than 'M/a' and less than or equal to 'M'. Accordingly, high-resolution phase data may be generated during a digital zoom operation. In this case, a ratio (i.e., phase data/image data) of a length of phase data to a length of image data may be greater than 'M/N' and smaller than "a·M/N". That is, the ratio of the length of the phase data to the length of the image data may be greater than a ratio in a full mode.

Figure 30:
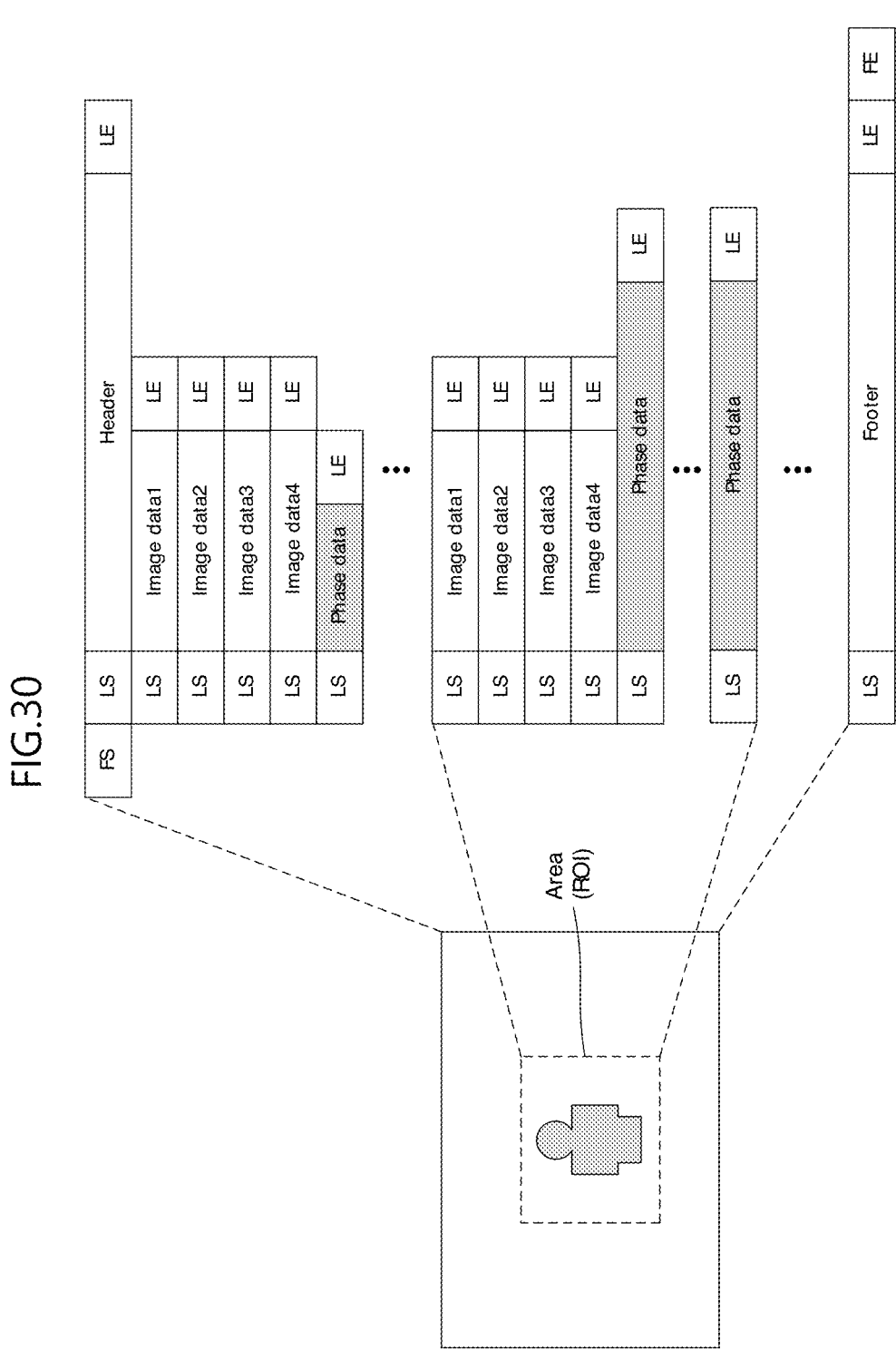
FIG. 30 is a diagram for describing an example of an image sensor with a variable length of phase data during an ROI operation.

FIG. 30 is a diagram for describing an example of an image sensor with a variable length of phase data during an ROI operation.

Referring to FIG. 30, an image processing device according to an embodiment of the present disclosure may receive information of an auto focus region-of-interest (AF ROI) from a touch signal of a display device such as a smart phone. For example, the AF ROI area may be an area displayed for an arbitrary location through pinch-to-zoom or may be an area, which a user wants to focus on, in an area currently displayed through touch AF. As illustrated in FIG. 30, the image sensor according to an embodiment of the present disclosure may provide high-resolution phase data by increasing a length of phase data corresponding to an ROI area, without increasing the length of phase data corresponding to an area outside the ROI area.

The above description refers to detailed embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

An image sensor according to an embodiment of the present disclosure may generate high-resolution phase data for a zoom area or an ROI area.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An image sensor comprising:
a pixel array including a plurality of pixels arranged in a row direction and a column direction; and
a read-out circuit configured to generate image data and phase data based on a sensing signal received from the pixel array,
wherein the image sensor is configured to control the resolution of phase data output by the read-out circuit depending on target area information for the pixel array, the target area information received from outside the image sensor,
wherein the image sensor is further configured to control the read-out circuit such that the ratio of the amount of the phase data to the amount of image data is changed based on the target area information received from outside the image sensor, and such that:
a) for a given set of pixels of the pixel array, a greater number of kernels is set for a crop zoom mode compared to a full mode; or
b) when the given set of pixels comprises a region-of-interest, a greater number of kernels per pixel is set for the given set of pixels compared to pixels not in the region-of-interest, and
wherein the same number of pixels of each color is included per kernel.

2. The image sensor of claim 1, configured such that a ratio of an amount of the phase data to an amount of the image data in a crop zoom mode is greater than the ratio of the amount of the phase data to the amount of the image data in a full mode.

3. The image sensor of claim 1, configured such that for a given pixel array size, an amount of phase data for a region-of-interest (ROI) area is greater than an amount of phase data for an area other than the ROI area.

4. The image sensor of claim 1,
wherein the image sensor is further configured to set a first kernel and a second kernel different from the first kernel in the pixel array based on the target area information, and
wherein a part of the first kernel overlaps a part of the second kernel.

5. The image sensor of claim 4, wherein the first kernel includes first pixels positioned in a first column of the pixel array and second pixels positioned in a second column of the pixel array, and
wherein the second kernel includes the second pixels positioned in the second column of the pixel array and third pixels positioned in a third column of the pixel array.

6. The image sensor of claim 5, wherein the read-out circuit generates first phase data through a binning operation on phase signals generated from the first pixels and the second pixels and generates second phase data different from the first phase data through the binning operation on phase signals generated from the second pixels and the third pixels.

7. The image sensor of claim 5, further comprising:
a first sub-analog-to-digital converter corresponding to the first pixels arranged in the first column;
a second sub-analog-to-digital converter corresponding to the second pixels arranged in the second column; and
a third sub-analog-to-digital converter corresponding to the third pixels arranged in the third column,
wherein the read-out circuit includes:
a first sub-phase data generation circuit corresponding to the first sub-analog-to-digital converter and the second sub-analog-to-digital converter; and
a second sub-phase data generation circuit corresponding to the second sub-analog-to-digital converter and the third sub-analog-to-digital converter.

8. The image sensor of claim 4, further configured to set the first kernel and the second kernel different from the first kernel in the pixel array based on the target area information, and
wherein pixels included in the first kernel and pixels included in the second kernel are arranged in different rows and different columns.

9. The image sensor of claim 8, further configured to set a third kernel and a fourth kernel in the pixel array based on the target area information,
wherein pixels included in the first kernel and pixels included in the third kernel are arranged in the same row, and
wherein pixels included in the second kernel and pixels included in the fourth kernel are arranged in the same row.

10. The image sensor of claim 9, wherein the pixels included in the first kernel and the pixels included in the third kernel are arranged in different columns, and
wherein the pixels included in the second kernel and the pixels included in the fourth kernel are arranged in different columns.

11. The image sensor of claim 4, further comprising:
a binning block connected between the pixel array and the read-out circuit and configured to perform a binning operation.

12. The image sensor of claim 11, wherein the binning block includes:
a first averaging block electrically connected to a first column line and a second column line and configured to perform a binning operation on an analog phase signal received through the first column line and an analog phase signal received through the second column line;
a second averaging block electrically connected to the second column line and a third column line and configured to perform the binning operation on the analog phase signal received through the second column line and an analog phase signal received through the third column line;
a first switch connected to the first averaging block; and
a second switch connected to the second averaging block,
wherein the first switch and the second switch are selectively turned on under control of the image sensor.

13. The image sensor of claim 12, further comprising:
a first sub-analog-to-digital converter corresponding to the first switch; and
a second sub-analog-to-digital converter corresponding to the second switch, wherein the first switch is configured to be turned on to deliver an output of the first averaging block to the first sub-analog-to-digital converter, and the second switch is configured to be turned on to deliver an output of the second averaging block to the second sub-analog-to-digital converter.

14. The image sensor of claim 13, wherein the binning block further includes:

a first selection circuit corresponding to the first column line and the first switch and selectively connected to the first switch; and a second selection circuit corresponding to the second column line and the second switch and selectively connected to the second switch.

15. An image sensor comprising:

a pixel array including a plurality of pixels arranged in a row direction and a column direction;

a read-out circuit configured to generate image data and phase data based on a sensing signal received from the pixel array, wherein the image sensor is configured such that for a target pixel area, a ratio of an amount of the phase data to an amount of the image data in a crop zoom mode is greater than a ratio of an amount of the phase data to an amount of the image data in a full mode; and wherein the image sensor is further configured to, in a zoom crop mode, set a first kernel and a second kernel different from the first kernel in the pixel array based on a zoom command and zoom area information received from an outside of the image sensor, wherein the number of kernels corresponding to the target pixel area in the full mode is different from the number of kernels corresponding to the target pixel area in the crop zoom mode.

16. The image sensor of claim 15, wherein:

a part of the first kernel overlaps a part of the second kernel.

17. The image sensor of claim 16, further configured to, in the full mode, set a first kernel and a second kernel so that the first kernel does not overlap the second kernel.

18. An image sensor comprising:

a pixel array including a plurality of pixels arranged in a row direction and a column direction;

a read-out circuit configured to generate image data and phase data based on a sensing signal received from the pixel array, wherein the image sensor is configured such that a resolution of the phase data for a region-of interest (ROI) area is higher than a resolution of the phase data for an area outside of the ROI area, wherein the image sensor is further configured to set a greater number of kernels per pixel for the ROI area compared to pixels not in the ROI area, and wherein the same number of pixels of each color is included per kernel.

19. The image sensor of claim 18, further configured to:

control the read-out circuit such that the resolution of the phase data for the ROI area is higher than the resolution of the phase data for the area outside the ROI area, based on ROI area information received from outside the image sensor, and set a first kernel and a second kernel different from the first kernel, wherein the first kernel and the second kernel correspond to the ROI area in the pixel array, wherein a part of the first kernel overlaps a part of the second kernel.

20. The image sensor of claim 19, further configured to set a third kernel and a fourth kernel for the area other than the ROI area in the pixel array, and wherein the third kernel does not overlap the fourth kernel.

\* \* \* \* \*